United States Patent
Ooi et al.

(10) Patent No.: US 12,443,884 B2
(45) Date of Patent: Oct. 14, 2025

(54) DEVICE, SYSTEM, AND METHOD FOR REDUCING MACHINE LEARNING BIAS IN MACHINE LEARNING GENERATED TEXTUAL LISTS OF TIME-STAMPED EVENTS

(71) Applicant: MOTOROLA SOLUTIONS, INC., Chicago, IL (US)

(72) Inventors: Chun Wen Ooi, Georgetown (MY); Wooi Ping Teoh, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 559 days.

(21) Appl. No.: 18/090,702

(22) Filed: Dec. 29, 2022

(65) Prior Publication Data

US 2024/0220850 A1    Jul. 4, 2024

(51) Int. Cl.
     *G06N 20/00*      (2019.01)

(52) U.S. Cl.
     CPC .................................. *G06N 20/00* (2019.01)

(58) Field of Classification Search
     CPC ....................................................... G06N 20/20
     See application file for complete search history.

(56) References Cited

U.S. PATENT DOCUMENTS

| | | | |
|---|---|---|---|
| 6,243,833 B1 | 6/2001 | Hitchcock et al. | |
| 9,785,630 B2 * | 10/2017 | Willmore | G06F 40/274 |
| 10,607,040 B1 * | 3/2020 | Gan | G06V 20/20 |
| 10,635,906 B1 | 4/2020 | Gan et al. | |
| 2015/0312175 A1 * | 10/2015 | Langholz | G06F 3/16 |
| | | | 715/752 |
| 2017/0169812 A1 * | 6/2017 | Lample | G10L 15/183 |
| 2018/0278504 A1 * | 9/2018 | Alazraki | H04L 65/70 |
| 2019/0362186 A1 * | 11/2019 | Irshad | G08G 1/0116 |
| 2021/0004751 A1 | 1/2021 | Zaslow et al. | |
| 2021/0035397 A1 * | 2/2021 | Srivastava | G06N 20/00 |
| 2021/0191963 A1 | 6/2021 | Walton et al. | |
| 2022/0044016 A1 * | 2/2022 | Pan | G06T 19/003 |
| 2022/0171920 A1 | 6/2022 | Tian et al. | |

(Continued)

OTHER PUBLICATIONS

Arteaga a Case for Humans in the Loop 2020.*

(Continued)

*Primary Examiner* — Paul M Knight
(74) *Attorney, Agent, or Firm* — Perry + Currier INC. (FOR MSI)

(57) ABSTRACT

A device, system, and method for reducing machine learning bias in machine learning generated textual lists of time-stamped events is provided. The device generates, via a machine learning algorithm, using sensor data related to the incident, a textual list of time-stamped events for an incident, one or more of the events associated with respective machine learning confidence scores. For a given time-stamped event having a respective machine learning confidence score less than a threshold confidence score, the device redacts the given event in the list and replaces it in the list with a field for receiving input, the list of rendered at a display screen with the given event in the list replaced with the field. The device receives, via an input device, input at the field and after receiving the input, un-redacts the given event, and renders, at the display screen, the received input received and the given event.

20 Claims, 13 Drawing Sheets

(56) References Cited

U.S. PATENT DOCUMENTS

| | | | | |
|---|---|---|---|---|
| 2022/0391732 | A1* | 12/2022 | Baudel | G06N 5/045 |
| 2023/0034574 | A1* | 2/2023 | Xie | G01C 21/26 |
| 2023/0237602 | A1* | 7/2023 | Bajaj | G06F 40/20 |
| | | | | 705/26.35 |
| 2024/0112046 | A1* | 4/2024 | Rahman | G06N 5/022 |
| 2024/0220850 | A1* | 7/2024 | Ooi | G06N 20/00 |
| 2024/0281722 | A1* | 8/2024 | Tirupathi | G06N 20/20 |

OTHER PUBLICATIONS

Chai Human in the loop Techniques in Machine Learning 2020.*
Deng Integrating Machine Learning with Human Knowledge 2020.*
Honeycutt Soliciting Human-in-the-Loop User Feedback 2020.*
Kumar Development of a Mathematical Human Sensor Model 2010.*
Liu human machine joint collaborative decision making 2019.*
Qu Combining Human and Machine Confidence Dec. 28, 2022.*
Rey Human in the loop machine learning Aug. 2022.*
Taudien the Effect of AI Advice on Human Confidence Jan. 2022.*
Zhang Effect of Confidence and Explanation on Accuracy 2020.*
Culotta, Aron, et al., "Corrective Feedback and Persistent Learning for Information Etraction", Oct. 2006, Artificial Intelligence, 170(14-15); 1101-1122, http://www.cs.iit.edu/~culotta/pubs/culotta06corrective.pdf.
Hollywood, John S., et al., "Using Video Analytics and Sensor Fusion in Law Enforcement: Building a Research Agenda That Includes Business Cases, Privacy and Civil Rights Protections, and Needs for Innovation", Jan. 2018; DOI: 10.7249/RR2619; https://www.rand.org/content/dam/rand/pubs/research_reports/RR2600/RR2619/RAND_RR2619.pdf.

* cited by examiner

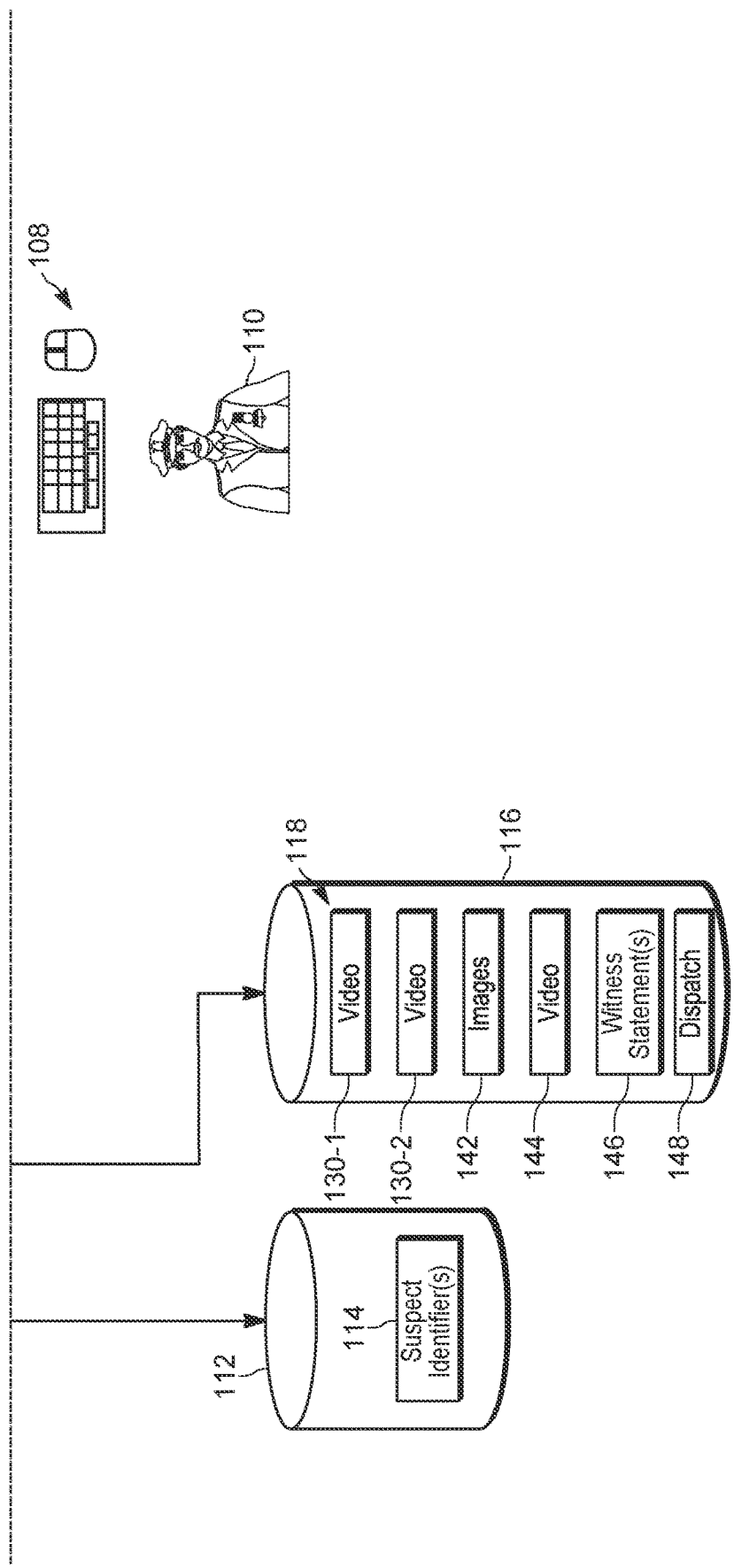

1002

How Likely Do You Think Derek Smith Is The Gunman?

1006
- ☐ Very Likely
- ☐ Likely
- ☐ Neutral
- ☐ Unlikely
- ☑ Very Unlikely 1008  1009

Very Unlikely — Unlikely — Neutral — Likely — Very Likely

Based On Your Investigation, Who Is The Gunman?

1010
- ☐ Derek Smith
- ☑ Bob Jones
- ☐ Other Suspect
- ☐ Further Investigation Needed Why?

1012 — Bob Jones Was Identified by Witnesses And I Reviewed Crime Scene Video And Bob Jones' Drivers Licence Photo And Confirmed The Gunman Appears To Be Bob Jones

FIG. 10B

DEVICE, SYSTEM, AND METHOD FOR REDUCING MACHINE LEARNING BIAS IN MACHINE LEARNING GENERATED TEXTUAL LISTS OF TIME-STAMPED EVENTS

BACKGROUND OF THE INVENTION

Machine learning algorithms and/or engines may be used to assist with public safety incidents, for example as part of an overall incident reporting process. However, such machine learning algorithms and/or engines may be subject to machine learning bias.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 10A and FIG. 10B respectively depict alternative fields used to replace given time-stamped events in textual lists of time-stamped events, in accordance with some examples.

Figure 1:
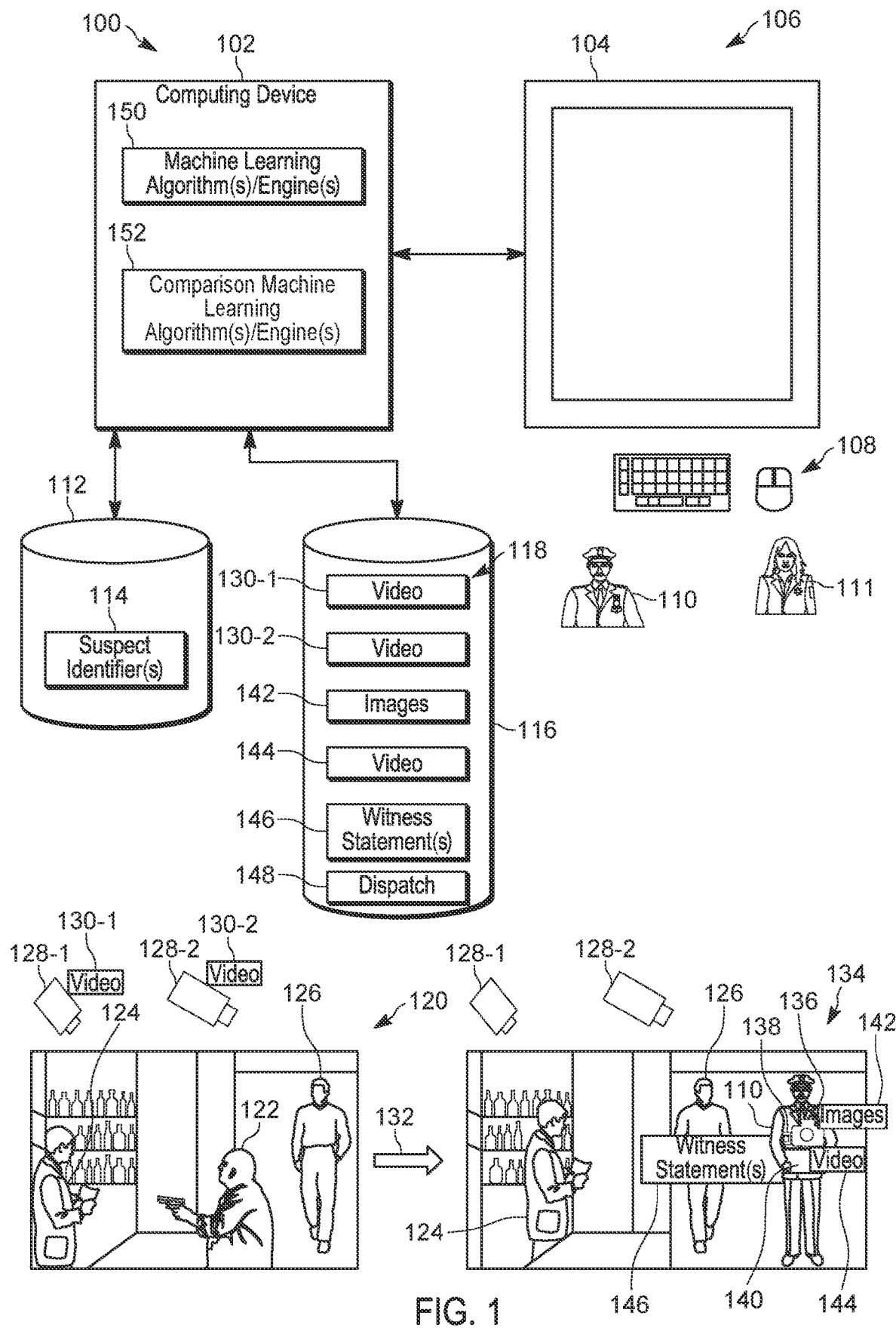
FIG. 1 is a system for reducing machine learning bias in machine learning generated textual lists of time-stamped events, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Machine learning algorithms and/or engines may be used to generate textual lists of time-stamped events for public safety incidents, as part of an incident report generation process, using sensor data associated with the public safety incidents (e.g. image data, video data, audio data, and the like, as well witness statements and/or dispatch data in an electronic format, and the like). However, such machine learning generated textual lists of time-stamped events may be generated incorrectly due to machine learning bias. In particular, machine learning feedback loops may be used to train machine learning algorithms and/or engines, but the labels and/or scores used to train the machine learning algorithms and/or engines may be produced by the machine learning algorithms and/or engines themselves, and/or generated via humans who are themselves biased, which may introduce and/or reinforce bias in the machine learning algorithms and/or engines. Hence, for example, a machine learning algorithm and/or engine may identify a suspect in a video, for example using a database of images of past suspects, but such an identification may be incorrect, which may lead to the arrest and possible conviction of the wrong perpetrator. Thus, there exists a need for an improved technical method, device, and system for reducing machine learning bias in machine learning generated textual lists of time-stamped events.

Hence, provided herein is a device, system, and method for reducing machine learning bias in machine learning generated textual lists of time-stamped events. For example, a computing device is provided that may access a database of sensor data collected in association with a public-safety incident. The computing device executes one or more machine learning algorithms, which uses the sensor data as input, to output a textual list of time-stamped events associated with the incident. One or more of the time-stamped events in the textual list are understood to be associated with respective machine learning confidence scores.

The computing device compares the respective machine learning confidence scores to a threshold confidence score. For a given time-stamped event, in the textual list, having a respective machine learning confidence score that is less than the threshold confidence score, the computing device redacts the given time-stamped event in the textual list of time-stamped events, for example at a display screen, and replaces the given time-stamped event in the textual list with a field for receiving input. The textual list of time-stamped events is rendered at the display screen with the given time-stamped event in the textual list replaced with the field for receiving the input. It is understood that due to the redaction, the redacted given time-stamped event is not rendered at the display screen.

The computing device may receive input at the field and, after receiving the input, the computing device may un-redact the given time-stamped event at the display screen. In particular the computing device renders, at the display screen, the input received at the field and the given time-stamped event.

In some examples, a comparison of the input received at the field and the given time-stamped event may occur to determine whether or not they match or differ.

In particular, the input received at the field and the given time-stamped event differing may indicate bias in the one or more machine learning algorithms or in the input, and hence a notification may be provided at a notification device to alert a third party that a closer examination of the evidence (e.g. the sensor data) is merited.

In some of these examples, a matching confidence score may be assigned to the comparison of the input and the given time-stamped event. The matching confidence score is generally indicative of whether, or not, the input received at the field and the given time-stamped event match. Based on the matching confidence score being below a threshold matching score, a notification thereof may be provided at a notification device, for example to provide an alert that the input received at the field and the given time-stamped event may not match. In particular, the matching confidence score being below a threshold matching score may indicate bias in the one or more machine learning algorithm or in the input, and hence the notification is an alert that a closer examination of the evidence (e.g. the sensor data) is merited, for example by a third party.

In some of these examples, the computing device may generate respective time-stamped events for the redacting and the receiving of the input, and the computing device may include the respective time-stamped events in the textual list of time-stamped events as rendered at the display screen. Such an inclusion is indicative that the computing device is implementing processes for reducing machine learning bias in machine learning generated textual lists of time-stamped events.

An aspect of the present specification provides a method comprising: generating, via a computing device, via one or more machine learning algorithms, using sensor data, a textual list of time-stamped events associated with an incident, the sensor data related to the incident and generated by sensors, one or more of the time-stamped events in the textual list associated with respective machine learning confidence scores: for a given time-stamped event, in the textual list, having a respective machine learning confidence score that is less than a threshold confidence score, redacting, via the computing device, the given time-stamped event in the textual list of time-stamped events and replacing the given time-stamped event in the textual list with a field for receiving input, the textual list of time-stamped events rendered at a display screen with the given time-stamped event in the textual list replaced with the field for receiving the input: receiving, via the computing device, input at the field: after receiving the input, un-redacting the given time-stamped event; and rendering, via the computing device, at a display screen, the input received at the field and the given time-stamped event.

Another aspect of the present specification provides a device comprising: a controller communicatively coupled to a display screen and an input device, the controller configured to: generate, via one or more machine learning algorithms, using sensor data, a textual list of time-stamped events associated with an incident, the sensor data related to the incident and generated by sensors, one or more of the time-stamped events in the textual list associated with respective machine learning confidence scores: for a given time-stamped event, in the textual list, having a respective machine learning confidence score that is less than a threshold confidence in score, redact the given time-stamped event in the textual list of time-stamped events and replace the given time-stamped event in the textual list with a field for receiving input, the textual list of time-stamped events rendered at the display screen with the given time-stamped event in the textual list replaced with the field for receiving the input: receive, via an input device, input at the field: after receiving the input, un-redact the given time-stamped event: and render, at the display screen, the input received at the field and the given time-stamped event.

Each of the above-mentioned aspects will be discussed in more detail below, starting with example system and device architectures of the system in which the embodiments may be practiced, followed by an illustration of processing blocks for achieving an improved technical method, device, and system for reducing machine learning bias in machine learning generated textual lists of time-stamped events.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine", such as a machine learning engine, is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for reducing machine learning bias in machine learning generated textual lists of time-stamped events. The various components of the system 100 are in communication via any suitable combination of wired and/or wireless communication links, and communication links between components of the system 100 are depicted in FIG. 1, and throughout the present specification, as double-ended arrows between respective components: the communication links may include any suitable combination of wireless and/or wired links and/or wireless and/or wired communication networks, and the like.

The system 100 comprises a computing device 102 that is interchangeably referred to hereafter as the device 102. The device 102 is in communication with a display screen 104 that may be a component of a communication device 106, that further includes one or more input devices 108, such as a keyboard, a pointing device, a touch screen of the display screen 104, and the like. As depicted, the communication device 106 may be operated by a public-safety officer 110, such as a police officer, interchangeably referred to hereafter as the officer 110. Alternatively, the communication device 106 may be operated by reviewer 111, such as a supervisor of the officer 110 and/or any other suitable reviewer. It is understood that while present examples are described with respect to both the officer 110 and the reviewer 111 operating the communication device 106, in other examples, the officer 110 may operate the communication device 106, and the reviewer 111 may operate another communication device that may be similar to, or different from, the communication device 106. Put another way, in examples herein in which the reviewer 111 is operating the communication device 106 that is providing textual lists of time-stamped events, the reviewer may be operating another communication device that is providing the same, or similar, textual lists of time-stamped events as described herein.

While the communication device 106 is depicted in the form of a terminal, the communication device 106 may have any suitable format including, but not limited to, a laptop, a mobile device, a cell phone, and the like. In some examples the device 102 may be a component of the communication device 106.

However, in other examples the device 102 may be separate from the communication device 106 and performing certain functionality on behalf of the communication device 106, as described herein: in these examples, the communication device 106 may have separate computing components which may cooperate with the device 102 to perform a portion of such functionality. Hence, the device 102 may comprise any suitable combination of one or more servers, one or more cloud computing devices, and the like.

In examples provided herein, the device 102 and the communication device 106 may be associated with a police entity, such as a police department of which the officer 110 and the reviewer 111 are members. However, the device 102 and the communication device 106 may be operated by any suitable entity and/or public service entity including, but not limited to, a firefighter entity, an emergency medical services entity, a private or public security guard and/or security service entity, and the like. Furthermore, the officer 110 and the reviewer 111 may be associated with same entity or different entities.

As depicted, the device 102 is in further communication with a memory 112, which, as depicted, may be provided in the form of a database, storing one or more suspect identifiers 114 (interchangeably referred to hereafter as the suspect identifiers 114 and/or a suspect identifier 114). The suspect identifiers 114 may comprise feature vectors, and the like, that corresponds to various visual and/or biometric traits of possible suspects in crimes, and the like; for example, such feature vectors, and the like, may be of faces of persons collected by a police entity, and/or accessible by electronic components of the entity operating the device 102. However, the one or more suspect identifiers 114 may comprise any suitable biometric data that may be extracted from sensor data, including, but not limited to, facial landmarks, gait data and the like. Hence, while feature vectors will be used here as an example of the suspect identifiers 114, the suspect identifiers 114 are understood to include any suitable identifiers 114.

As depicted the device 102 is in further communication with a memory 116, which, as depicted, may be provided in the form of a database, storing sensor data 118 related to an incident and generated by sensors, as described herein. In particular, the sensor data 118 may comprise any suitable combination of video data, image data, audio data, electronic witness statements, electronic dispatch data, and the like, collected in association with investigating an incident.

For example, as depicted, an incident 120 of an armed robbery of a bar may have occurred, in which a gunman 122 robbed a bartender 124 using a gun, and a witness 126 to the robbery walked in through a door to the bar during the incident 120. As depicted, the bar includes two video cameras 128-1, 128-2, the video camera 128-1 positioned to capture video 130-1 of the gunman 122 and the bartender 124, and the video camera 128-2 positioned to capture video 130-2 of the door of the bar. The video cameras 128-1, 128-2 are interchangeably referred to hereafter, collectively, as the video cameras 128 and, generically, as a video camera 128. This convention will be used throughout the present specification. For example, the videos 130-1, 130-2 are interchangeably referred to hereafter as the videos 130 and/or a video 130.

The video cameras 128 may comprise any suitable closed-circuit video cameras, and the like, and/or may be video cameras held or worn by the bartender 124 and/or the witness 126. In some examples the video 130 is stored at the respective video cameras 128 while in other examples the video 130 may be stored by a memory in communication with the video cameras 128, which may be on-premises at the bar and/or at a cloud server, and the like.

Furthermore, it is understood that, at a later time, as represented by the arrow 132, the officer 110 may visit the bar to interview 134 the bartender 124 and the witness 126. As depicted, the officer 110 is further equipped with a camera 136, a body worn camera (BWC) 138, and laptop and/or tablet 140, and the like. The camera 136 may be operated by the officer 110 to collect images 142 of the bar (e.g. an incident scene), the BWC 138 may be used to collect video 144 of the bartender 124 and the witness 126 making witness statements, and the tablet 140 may be used to collect textual electronic witness statements 146. The tablet 140 may be further used to collect the video 130 from the video cameras 128.

It is understood that the videos 130, the images 142, the video 144 and the textual electronic witness statements 146 may be uploaded to the memory 116, for example by the tablet 140, for storage as the sensor data 118, stored in association with the incident 120 (e.g. using an incident identifier, and the like).

It is further understood that at least the videos 130, 144 and the images 142, are time-stamped, such that the videos 130, 144 include times and dates that frames of the videos 130, 144 were collected, and the images 142 include times and dates that the images 142 were collected. It is further understood that textual electronic witness statements 146 may include estimated times that events indicated in the textual electronic witness statements 146 occurred, and/or the textual electronic witness statements 146 include times and dates that the textual electronic witness statements 146 were collected.

While the upload of the sensor data 118 is not depicted, such an upload may occur in any suitable manner, for example via the tablet 140 wirelessly connecting with the memory 116. Alternatively, the tablet 140 may comprise the computing device 102 and the memory 116 may comprise a memory of the tablet 140.

Indeed, the computing device 102, the communication device 106 and the tablet 140 may be combined in any suitable manner. For example, the tablet 140 may comprise the computing device 102 and the communication device 106. In another example, tablet 140 may comprise the communication device 106, and the computing device 102 may comprise a cloud computing device. In another example, the tablet 140 may comprise the computing device 102, and the communication device 106 may comprise a separate terminal and/or personal computer and/or laptop, and the like. In another example, the computing device 102 and the communication device 106 may be combined, and the tablet 140 may comprise a separate device. In yet another example, the computing device 102, the communication device 106 and the tablet 140 may be separate devices.

As depicted, the sensor data 118 further includes electronic dispatch data 148 which may comprise sensor data, and the like, received from a dispatch device and/or public-safety answering point (not depicted), which received a 911 call, and the like, reporting the incident 120 (e.g. placed by the bartender 124 and/or the witness 126. The dispatch data 148 is generally understood to indicate events that occurred in association with the dispatch device and/or public-safety answering point including, but not limited to, a time of the 911 call, who made the 911 call, when the officer 110 was dispatched the scene of the incident 120, and the like, and/or any other suitable dispatch data.

As depicted, the device 102 further implements one or more machine learning algorithms 150 which, as depicted, may be implemented as one or more machine learning engines. For simplicity, the one or more machine learning algorithms 150 and/or one or more machine learning engines are interchangeably referred to hereafter as a machine learning algorithm 150.

The machine learning algorithm 150 is generally configured to generate a textual list of time-stamped events associated with an incident, such as the incident 120, using sensor data, such as the sensor data 118. Such a textual list of time-stamped events may be associated with respective machine learning confidence scores. Hereafter, reference to the sensor data 118 and the incident 120 will be used as an example of functionality of the machine learning algorithm 150.

For example, the machine learning algorithm 150 may receive the sensor data 118 as input from the memory 116, and identify events in the sensor data 118 using any suitable combination of video analytics, image analytics, audio analytics, textual analytics, and the like, to identify the events and an associated time. The machine learning algorithm 150 output a textual list of time-stamped events with the time-stamped events identified by the machine learning algorithm 150 ordered with respect a time thereof. For example, the machine learning algorithm 150 may analyze the video 130-1 and output a textual time-stamped event of "13:01: Gunman points gun at bartender" or "13:03: witness enters the bar".

It is further understood that such time-stamped events may further include the machine learning algorithm 150 comparing an image of the gunman 122, extracted from the sensor data 118 (such as the video 130-1), to the suspect identifiers 114 to attempt to identify the gunman 122. Put another way, the time-stamped events may include both events determined from the sensor data 118 as well as events performed by the machine learning algorithm 150 (and/or the device 102) in processing and/or analyzing the sensor data 118. Furthermore, feature vectors, and/or any other suitable biometric data in any suitable format that is similar to the suspect identifiers 114, may be extracted from an image of the gunman 122 for comparison with the suspect identifiers 114.

It is further understood that the machine learning algorithm 150 may assign a respective machine learning confidence score for a time-stamped event determined by the machine learning algorithm 150. Such a machine learning confidence score may comprise a confidence level of a determination of a time-stamped event, for example on a scale of 0% to 100%, with higher scores indicating a higher level of respective confidence in determining a time-stamped event, and a lower scores indicating a lower level of respective confidence in determining a time-stamped event.

It is understood that certain time-stamped events may be determined with a higher level of accuracy than other time-stamped events. For example, a time-stamped event that merely identifies an action and/or items in a video, such as "gunman enters the bar" or "witness enters the bar", may be predicted with a relatively higher level of confidence, whereas events that include determinations and/or judgements by the machine learning algorithm 150 related to identifying suspects, such as the gunman 122, identifying specific crimes, and the like, may be predicted with a relatively lower level of confidence.

Such events generated by the machine learning algorithm 150 with a relatively lower level of confidence may be in certain categories, such as events related to charge and arrest of specific persons which may include, but is not limited to, a specific identification of personally identifiable information (PII) of a suspect, such as their name, address, license plate number, and the like, specific identification of a crime, and the like. Hence, for example, the machine learning algorithm 150 generating an event that identifies a possible name of the gunman 122 may have a relatively lower level of confidence as compared to generating an event that identifies an item held by the gunman 122, such as a gun (and the gunman 122 merely holding a gun may or may not be a crime, depending on an associated jurisdiction). Similarly, for example, the machine learning algorithm 150 generating an event in which a specific crime perpetrated by the gunman 122 for which charges may be laid is identified, such as "gunman points gun at bartender" may have a relatively lower level of confidence as compared to generating an event in which no crime is perpetrated, such as the gunman 122 entering the bar.

Hence, such events generated by the machine learning algorithm 150 with a relatively lower level of confidence may be subject to machine learning bias, for example as training the machine learning algorithm 150 to identify suspects may be based on a machine learning feedback loop that introduces such bias using, for example, machine learning scores generated by the machine learning algorithm 150 itself.

As such, the device 102 is further configured to compare a respective machine learning confidence score to a threshold confidence score, which may be 80%, 90%, 95%, amongst other possibilities. In some examples, a threshold confidence score may be preconfigured and/or fixed, while in other examples the threshold confidence score may be increased or decreased, for example by an administrator of the system 100 and/or the officer 110, to better identify time-stamped events that may be associated with machine learning bias.

In yet further examples, the threshold confidence score may depend on a category of a given time stamped event. For example, a given time stamped event that includes the machine learning algorithm 150 identifying PII of a suspect, such as the gunman 122, and/or a crime, such as the gunman 122 pointing a gun at the bartender 124, may be associated with a higher threshold confidence score (e.g. 95%, amongst other possibilities) than a given time stamped event that includes the machine learning algorithm 150 identifying objects, and the like, held by a suspect and/or actions of witnesses, such as the bartender 124 and/or the witness 126, may be associated with a lower threshold confidence score (e.g. 85%, amongst other possibilities).

The device 102 is further generally configured, for a given time-stamped event, in the textual list, having a respective machine learning confidence score that is less than a threshold confidence score, to redact the given time-stamped event in the textual list of time-stamped events and replace the given time-stamped event in the textual list with a field for receiving input.

Furthermore, in some examples, when a time-stamped event has an associated machine learning confidence score that is equal to the threshold confidence score, the redacting and replacing described herein may not occur, while in other examples, when a time-stamped event has an associated machine learning confidence score that is equal to the threshold confidence score, the redacting and described herein may occur. Put another way, the system 100 may be configured with any suitable threshold confidence score and/or in any suitable mode for comparing machine learning confidence scores with threshold confidence scores.

Furthermore, the device 102 may generally render the textual list of time-stamped events at the display screen 104 with the given time-stamped event in the textual list replaced with the field for receiving the input. Hence, the officer 110 may review the textual list of time-stamped events at the display screen 104 with the given time-stamped event in the textual list replaced with the field for receiving the input. Furthermore the field may be provided with a prompt (e.g. which may be in the form of a question) for the officer 110 to operate the input device 108 to enter the input at the field.

In a specific example, the device 102, via the machine learning algorithm 150, may have determined a possible identity of the gunman 122, for example at a machine learning confidence level of 65%, which may be less than a threshold confidence level of 95%. As such, a given time-stamped event may comprise the machine learning algorithm 150 determining a possible identity of the gunman 122, which may be redacted at the textual list of time-stamped events as rendered at the display screen 104 and replaced at the display screen 104 with a field adjacent a question of "Can you identify the gunman?", and the like. The officer 110 may then operate the input device 108 to enter a determination by the officer 110 of the identity of the gunman 122 in the field.

After receiving the input in the field, the device 102 may un-redact, at the display screen 104, the given time-stamped event determined by the machine learning algorithm 150 and render at the display screen 104, the input received at the field and the given time-stamped event. Such un-redacting and rendering enables the input received at the field and the given time-stamped event to be visually compared to determine whether there is a match or not a match. When a match, an image of the gunman 122 (e.g. training input), and labeled data identifying the gunman 122 (e.g. training output labeled with a score of "100" and/or any suitable score above the threshold confidence score), as generated by the machine learning algorithm 150, may be provided to the machine learning algorithm 150 in a machine learning feedback loop as positive machine learning training feedback. When not a match, an image of the gunman 122 (e.g. training input), and labeled data identifying the gunman 122 (e.g. training output labeled with a score of "0" and/or any suitable score below the threshold confidence score) may be provided to the machine learning algorithm 150 in a machine learning feedback loop as negative machine learning training feedback. Either way, the machine learning algorithm 150 may be better trained to generate textual lists of time-stamped events associated with an incident, using sensor data, and/or machine learning bias may be reduced in the machine learning algorithm 150.

In particular, the visual comparison may be performed by the officer 110, who may label the data identifying the gunman 122 accordingly, and/or the visual comparison may be performed by the reviewer 111, such as a supervisor of the officer 110, who may similarly label the data identifying the gunman 122. Put another way, rather than the officer 110, the communication device 106 may be operated by the reviewer 111 reviewing the textual list of time-stamped events associated with the incident 120. Alternatively, the reviewer may operate another communication device (e.g. different from the communication device 106) to review the textual list of time-stamped events associated with the incident 120 (e.g. at a location different from that of the officer 110), with the components of the system 100 configured to provide the textual list of time-stamped events associated with the incident 120 at such a communication device.

Alternatively, the comparison may be performed by the device 102, for example using another machine learning algorithm 152 (e.g. a comparison machine learning algorithm and/or engine), which may assign a matching confidence score to comparing of the input and the given time-stamped event. Such a comparison is described in more detail herein, but may include, but is not limited, to comparing identifiers 114 and/or images and/or comparing sentences meanings and/or context (e.g. using semantic processing of words, phrases, sentences, and the like), and the like.

Based on the matching confidence score being below a threshold matching score (e.g. 85%, 90%, 95%, amongst other possibilities, which may be the same or different as the aforementioned threshold confidence score), a notification thereof may be provided at a notification device, such as the display screen 104 and/or another notification device, which may prompt the above described visual comparison.

Alternatively, when the matching confidence score is above the threshold matching score, an image of the gunman 122 (e.g. training input), and labeled data identifying the gunman 122 (e.g. training output) may be provided to the machine learning algorithm 150 in a machine learning feedback loop as positive machine learning training feedback: in particular, the training output may be labeled with the matching confidence score that is above the threshold matching score and/or "100" when the match has been confirmed. When not a match, an image of the gunman 122 (e.g. training input), and labeled data identifying the gunman 122 (e.g. training output also labeled with the matching confidence score that is below the threshold matching score and/or "0" when a confirmation of no match has been confirmed) may be provided to the machine learning algorithm 150 in a machine learning feedback loop as negative machine learning training feedback. Either way, the machine learning algorithm 150 may be better trained to generate textual lists of time-stamped events associated with an incident, using sensor data, and/or machine learning bias may be reduced in the machine learning algorithm 150.

In some examples, only positive machine learning training feedback may be provided in a machine learning feedback loop. In other examples, only negative machine learning training feedback may be provided in a machine learning feedback loop. In yet further examples, both positive machine learning training feedback and negative machine learning training feedback may be provided in a machine learning feedback loop. Regardless, the machine learning algorithm 150 may be better trained to generate textual lists of time-stamped events associated with an incident, using sensor data, and/or machine learning bias may be reduced in the machine learning algorithm 150.

Figure 2:
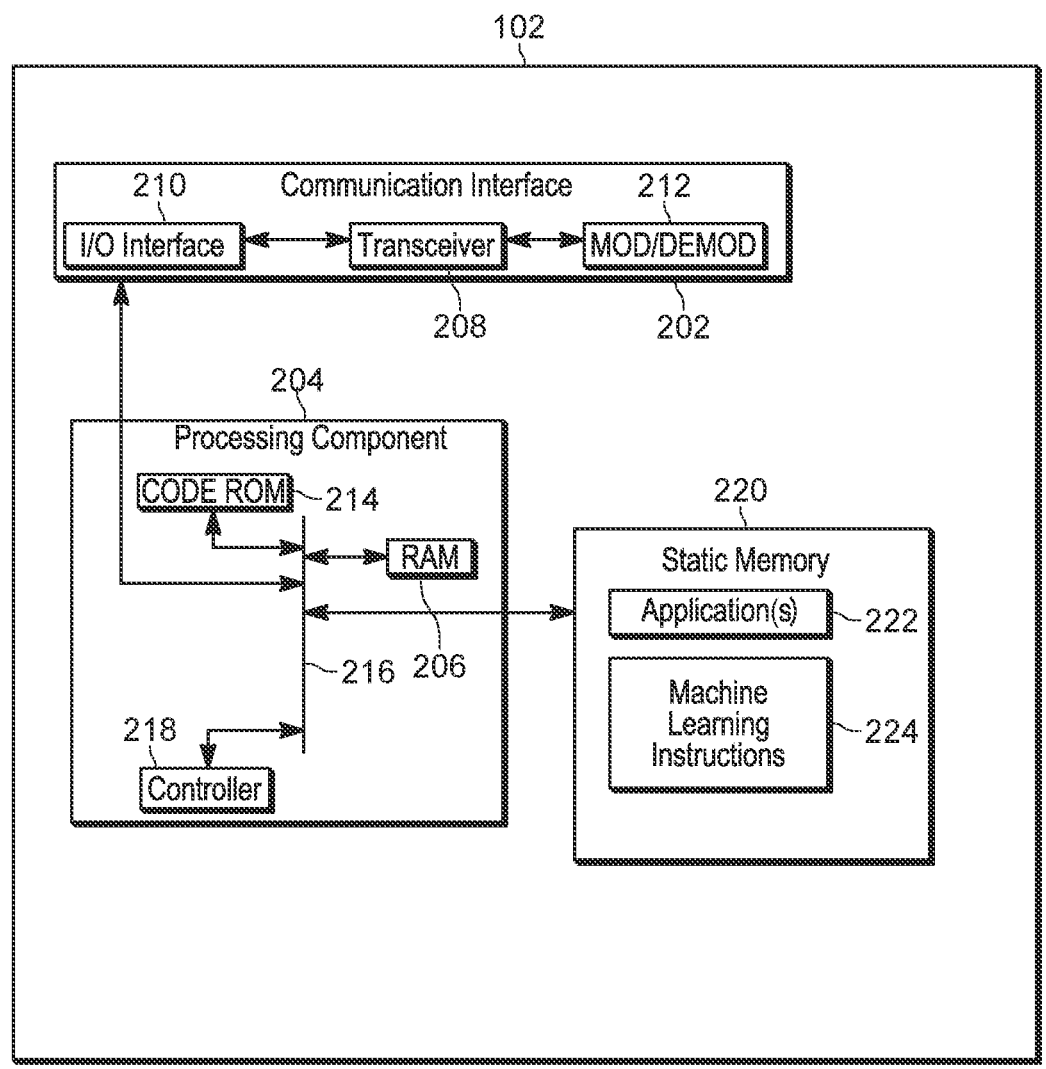
FIG. 2 is a device diagram showing a device structure of a communication device for reducing machine learning bias in machine learning generated textual lists of time-stamped events, in accordance with some examples.

Attention is next directed to FIG. 2, which depicts a schematic block diagram of an example of the device 102. While the device 102 is depicted in FIG. 2 as a single component, functionality of the device 102 may be distributed among a plurality of components, such as a plurality of servers and/or cloud computing devices and/or may be combined with the communication device 106.

As depicted, the device 102 comprises: a communication interface 202, a processing component 204, a Random-Access Memory (RAM) 206, one or more wireless transceivers 208, one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the device 102 via the common data and address bus 216. Hereafter, the at least one application 222 will be interchangeably referred to as the application 222. Furthermore, a portion of the memory 220 may comprise the memory 112 and/or the memory 116.

Furthermore, while the memories 206, 214 are depicted as having a particular structure and/or configuration, (e.g., separate RAM 206 and ROM 214), memory of the device 102 may have any suitable structure and/or configuration.

While not depicted, the device 102 may include one or more of an input device and/or a display screen, which, when present, may be communicatively coupled to the controller 218. Alternatively, the input device 108 and/or the display screen 104 may be communicatively coupled to the controller 218.

As shown in FIG. 2, the device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100.

Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the device 102 is not a generic controller and/or a generic device, but a device specifically configured to implement functionality for reducing machine learning bias in machine learning generated textual lists of time-stamped events. For example, in some examples, the device 102 and/or the controller 218 specifically comprises a computer executable engine configured to implement functionality for reducing machine learning bias in machine learning generated textual lists of time-stamped events.

The static memory 220 comprises a non-transitory machine readable medium that stores machine readable instructions to implement one or more programs or applications. Example machine readable media include a non-volatile storage component (e.g., Erasable Electronic Programmable Read Only Memory ("EEPROM"), Flash Memory) and/or a volatile storage component (e.g., random-access memory ("RAM")). In the example of FIG. 2, programming instructions (e.g., machine readable instructions) that implement the functionality of the device 102 as described herein are maintained, persistently, at the memory 220 and used by the controller 218, which makes appropriate utilization of volatile storage during the execution of such programming instructions.

Furthermore, the memory 220 further stores one or more sets of machine learning algorithm (and/or engine) programming instructions 224 (e.g. labeled "Machine Learning Instructions" in FIG. 2) that, when executed by the controller 218, enables the controller 218 to implement the machine learning algorithms (and/or engines) 150, 152.

Figure 3:
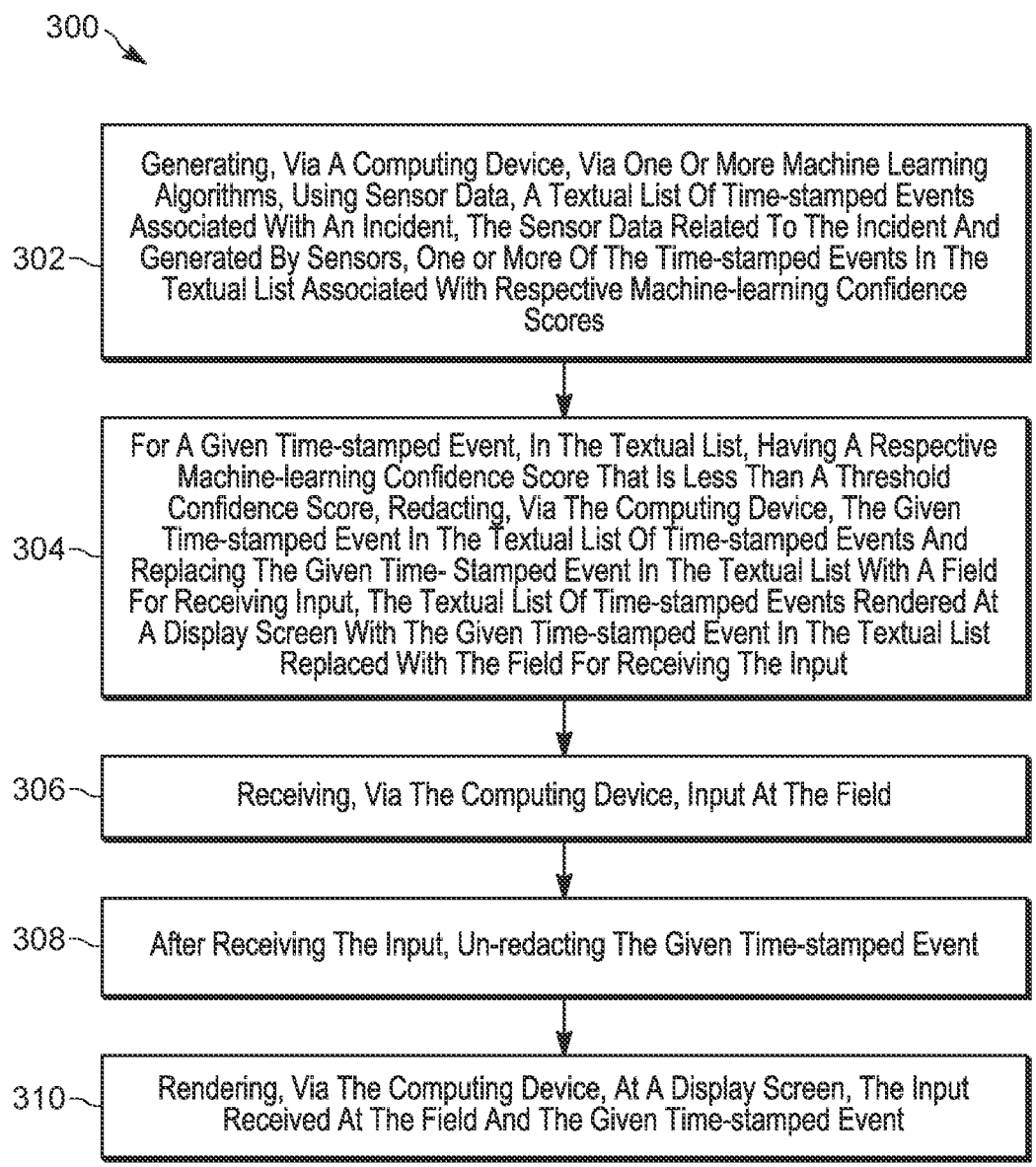
FIG. 3 is a flowchart of a method for reducing machine learning bias in machine learning generated textual lists of time-stamped events, in accordance with some examples.

In particular, the memory 220 stores instructions corresponding to the at least one application 222 (and the programming instructions 224) that, when executed by the controller 218, enables the controller 218 to implement functionality for training machine learning algorithms to reducing machine learning bias in machine learning generated textual lists of time-stamped events, including but not limited to, the blocks of the method set forth in FIG. 3.

The application 222 and/or the programming instructions 224 may include programmatic algorithms, and the like, to implement functionality as described herein including, but not limited to, executing the machine learning algorithms 150, 152 performing the aforementioned redacting a given time-stamped event in a textual list of time-stamped events and replacing the given time-stamped event in the textual list with a field for receiving input, etc.

The machine learning algorithms 150, 152 may include, but are not limited to: a deep-learning based algorithm: a neural network: a generalized linear regression algorithm: a random forest algorithm: a support vector machine algorithm: a gradient boosting regression algorithm: a decision tree algorithm: a generalized additive model: evolutionary programming algorithms: Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, and the like. Any suitable machine learning algorithm and/or deep learning algorithm and/or neural network is within the scope of present examples, with the programming instructions 224 adapted accordingly.

While details of the communication device 106 (e.g. when separate from the device 102), the video cameras 128, the camera 136, the BWC 138 and the tablet 140 are not depicted, the communication device 106, the video cameras 128, the camera 136, the BWC 138 and the tablet 140 (e.g. when separate from the device 102) may have components similar to the device 102 adapted, however, for the functionality thereof. For example the video cameras 128, the camera 136 and the BWC 138 may comprise sensors for capturing images and/or audio and/or video, such as charge-coupled devices (CCDs), microphones, and the like.

Attention is now directed to FIG. 3, which depicts a flowchart representative of a method 300 for reducing machine learning bias in machine learning generated textual lists of time-stamped events. The operations of the method 300 of FIG. 3 correspond to machine readable instructions that are executed by the device 102, and specifically the controller 218 of the device 102. In the illustrated example, the instructions represented by the blocks of FIG. 3 are stored at the memory 220 for example, as the application 222. The method 300 of FIG. 3 is one way that the controller 218 and/or the device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the device 102, generates, via the one or more machine learning algorithms 150, using the sensor data 118, a textual list of time-stamped events associated with the incident 120, the sensor data 118 related to the incident 120 and generated by sensors (e.g. at least the video cameras 128, the camera 136, and the BWC 138, and the like), one or more of the time-stamped events in the textual list associated with respective machine learning confidence scores.

In some examples, the method 300 may further include the controller 218, and/or the device 102 selecting the one or more machine learning algorithms 150 based on a type of the incident 120. For example, the device 102 may store and/or have access to, a plurality of machine learning algorithms 150 associated with different incident types and are hence respectively trained to identify different types of actions and/or objects depending on the respective associated incident type. For example, a machine learning algorithm 150 associated with an incident type of an "armed robbery" may be trained to attempt to identify a gunman, while a machine learning algorithm 150 associated with an incident type of a "traffic incident" may be trained to attempt to identify makes and models of vehicles. A type of the incident 120, such as an "armed robbery", or a "traffic accident" may be received at the input device 108 and/or may be stored at the memory 116 in association with the sensor data 118, and the controller 218, and/or the device 102 selecting the one or more machine learning algorithms 150 based on the type of the incident 120.

At a block 304, the controller 218, and/or the device 102, for a given time-stamped event, in the textual list, having a respective machine learning confidence score that is less than a threshold confidence score, redacts the given time-stamped event in the textual list of time-stamped events and replaces the given time-stamped event in the textual list with a field for receiving input, the textual list of time-stamped events rendered at the display screen 104 with the given time-stamped event in the textual list replaced with the field for receiving the input.

In some examples, given time-stamped events of the textual list may be rendered at the display screen 104 as they are generated, with the redacting and replacing of the given time-stamped event having a respective machine learning confidence score that is less than a threshold confidence score occurring after some given time-stamped events are generated, but before further given time-stamped events are generated. In other examples, the textual list may be rendered at the display screen 104 after the textual list is generated, excluding any updated to the textual list that may occur due to interactions with the field as described herein.

Furthermore, in some examples, the method 300 may further comprise the controller 218 and/or the device 102 providing, with the field, access to respective sensor data 118 used to generate the given time-stamped event that has a respective machine learning confidence score that is less than the threshold confidence score. For example, a link to a video 130, and/or a portion of the video 130, as stored at the memory 116, from which the given time-stamped event was generated may be provided with the field such that the display screen 104 and the input device 108 may be used to review the video 130 and/or the portion thereof from which the given time-stamped event was generated.

Similarly, in further examples, the method 300 may further comprise the controller 218 and/or the device 102 providing, with the field, an identifier of respective sensor data 118 used to generate the given time-stamped event that has a respective machine learning confidence score that is less than the threshold confidence score. For example, an identifier of a video 130, and/or a portion of the video 130, as stored at the memory 116, from which the given time-stamped event was generated may be provided with the field such that the display screen 104 and the input device 108 may be used to retrieve and view the video 130 and/or the portion thereof from which the given time-stamped event was generated.

In yet further examples, the method 300 may further comprise the controller 218 and/or the device 102 categorizing the given time-stamped event that has a respective machine learning confidence score that is less than the threshold confidence score, and the threshold confidence score may be selected based on a category of the given time-stamped event. As has already been described, for example, a given time stamped event that includes the machine learning algorithm 150 identifying PII of a suspect and/or a crime of a suspect may be associated with a relatively higher threshold confidence score (e.g. 95%, amongst other possibilities), and a given time stamped event that includes the machine learning algorithm 150 identifying objects, and the like, held by a suspect and/or actions of witnesses, may be associated with a relatively lower threshold confidence score (e.g. 85%, amongst other possibilities).

Indeed, in some examples, the method 300 may further comprise: the controller 218 and/or the device 102 categorizing the given time-stamped event that has a respective machine learning confidence score that is less than the threshold confidence score: and performing the redacting and the replacing based on the given time-stamped event being in a given category. For example, when a given time stamped event comprises identifying PII of a suspect, and/or when a given time stamped event comprises identifying crime of a suspect, and/or when a given time stamped event is associated with charging a suspect and/or arresting a suspect, the redacting and the replacing may always occur regardless of the respective machine learning confidence score and/or the threshold confidence score.

In some examples, a respective threshold confidence level associated with given time-stamped events that comprise identifying PII and/or a crime of a suspect and/or charging a suspect and/or arresting a suspect may be set high enough (e.g. 98%, 99%, 100%, amongst other possibilities) such that a respective machine learning confidence score may always, and/or almost always, be below the respective threshold confidence score. Indeed, in these examples where the respective machine learning confidence score is above the respective threshold confidence score (e.g. the respective machine learning confidence score may be 100%), machine learning bias may not be affecting the identifying of the PII and/or crime of a suspect and hence the redacting and the replacing time-stamped events, as described herein, may not occur.

At a block 306, the controller 218, and/or the device 102, receives input at the field.

For example, the officer 110, or the reviewer 111, may operate the input device 108 to enter input at the field.

In some examples, the field may comprise a field to receive text at the field (e.g. a blank field). In other examples, the field may comprise a multiple-choice selection field (e.g. in which an identity of a suspect may be selected and/or in which provides a plurality of electronic boxes, one of which may be selected to indicate a likelihood that the identity of a suspect, as determined by the machine learning algorithm 150, is correct). In yet further examples, the field may comprise a slider field (e.g. having a plurality of positions which may be associated with different likelihood that the identity of a suspect, as determined by the machine learning algorithm 150, is correct). However, the field may comprise any suitable combination of one or more of a blank field, a multiple-choice selection field, a slider field, and/or any other suitable type of field. Examples of such fields are described with respect to FIG. 10A and FIG. 10B.

At a block 308, the controller 218, and/or the device 102, after receiving the input, un-redacts the given time-stamped event.

At a block 310, the controller 218, and/or the device 102 renders, at the display screen 104, the input received at the field and the given time-stamped event.

Figure 9:
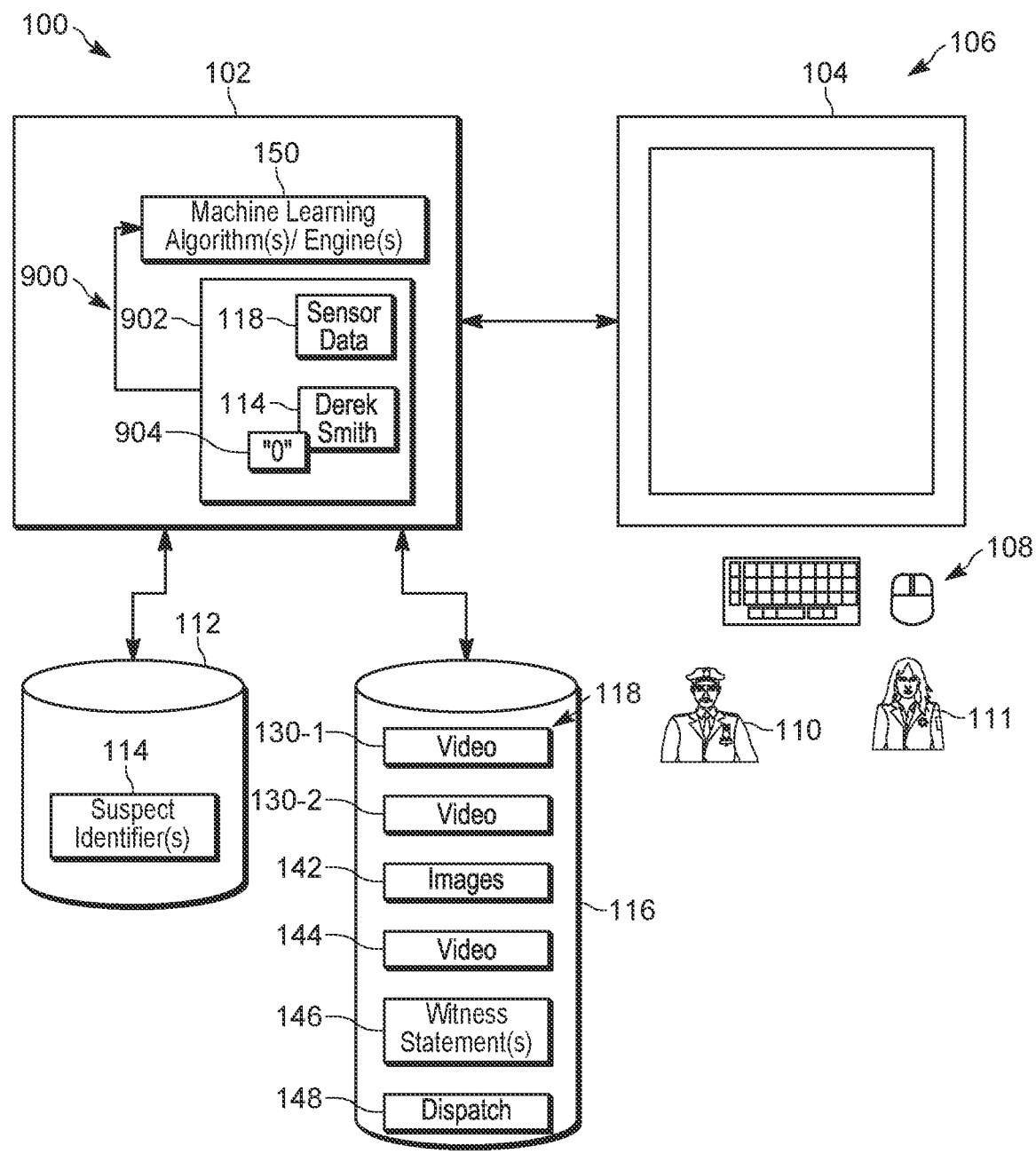
FIG. 9 depicts a machine learning feedback loop to better train a machine learning algorithm and/or engine to generate textual lists of time-stamped events, in accordance with some examples.

Hence, the officer 110 and/or the reviewer 111 may review the input received at the field and the given time-stamped event to visually compare the input received at the field and the given time-stamped event to determine whether there is a match (or not) and/or label data indicative of the given time-stamped event as determined by the machine learning algorithm 150 accordingly, as described herein at least with respect to FIG. 9, for use in a machine learning feedback loop, to better train the machine learning algorithm 150 and/or to reduce machine learning bias thereof. Furthermore, when the input received at the field and the given time-stamped event differ, the officer 110 and/or the reviewer 111 may further investigate, and decide whether to provide new and/or additional input (including, but not limited to, revising previous input) that may be added to the textual list using input devices 108.

The method 300 may include further features.

For example, the method 300 may further comprise the controller 218, and/or the device 102, based on determining that the input received at the field and the given time-stamped event differ, providing a notification thereof at a notification device, such as the display screen 104. An example of such a notification is described herein with respect to FIG. 8.

Similarly, the method 300 may further comprise the controller 218, and/or the device 102, comparing the input received at the field and the given time-stamped event: assigning a matching confidence score to comparing of the input and the given time-stamped event: and based on the matching confidence score being below a threshold matching score, providing a notification thereof at a notification device, such as the display screen 104.

As has been previously described, when the input received at the field and the given time-stamped event match or differ, and/or when the matching confidence score is above or below a threshold matching score, an image of the gunman 122 (e.g. training input), and labeled data identifying the gunman 122 (e.g. training output) may be provided to the machine learning algorithm 150 in a machine learning feedback loop.

In yet further examples, the method 300 may further comprise the controller 218, and/or the device 102: generating a respective time-stamped event for the redacting or the receiving the input of the block 304: and including the respective time-stamped events in the textual list of time-stamped events as rendered at the display screen 104.

For example, when the controller 218, and/or the device 102 (e.g. at the block 304) redacts the given time-stamped event that has a respective machine learning confidence score that is less than the threshold confidence score, or replaces the given time-stamp event with the field, the controller 218 and/or the device 102 may generate a respective time-stamped event and add the respective time-stamped event to the textual list of time-stamped events.

Additionally, or alternatively, when the controller 218, and/or the device 102 receives the input at the field (e.g. at the block 306) the given time-stamped event with the field, the controller 218 and/or the device 102 may generate a respective time-stamped event and add the respective time-stamped event to the textual list of time-stamped events.

Additionally, or alternatively, when the controller 218, and/or the device 102 un-redacts the given time-stamped event (e.g. at the block 308) and/or renders the input received at the field and the given time stamped event at the display screen 104, the controller 218 and/or the device 102 may generate a respective time-stamped event and add the respective time-stamped event to the textual list of time-stamped events.

Put another way, as events occur at the controller 218, and/or the device 102 in association with executing the method 300, any suitable respective time-stamped event may be generated and added to the textual list of time-stamped events as rendered at the display screen 104.

Attention is next directed to FIG. 4, FIG. 5, FIG. 6, FIG. 7, FIG. 8 and FIG. 9, which depict aspects of the method 300. FIG. 4, FIG. 5, FIG. 6, FIG. 7, FIG. 8 and FIG. 9 are substantially similar to FIG. 1, with like components having like numbers; while the incident 120 and the interview 134 are not depicted, the sensor data 118 associated therewith is understood to be stored at the memory 116.

Furthermore, while not all components of the system 100 are depicted in all of FIG. 4, FIG. 5, FIG. 6, FIG. 7, FIG. 8 and FIG. 9, they are nonetheless understood to be present. For example, in FIG. 4, while the comparison machine learning algorithm 152 is not depicted, the comparison machine learning algorithm 152 is understood be present. Similarly, in FIG. 5, FIG. 6, and FIG. 7, while neither of the machine learning algorithms 150, 152 are depicted, the machine learning algorithms 150, 152 are nonetheless understood to be present.

Furthermore, in the following description, it is understood that a threshold confidence score (e.g. of the block 304 of the method 300) has been set to 95%.

Figure 4:
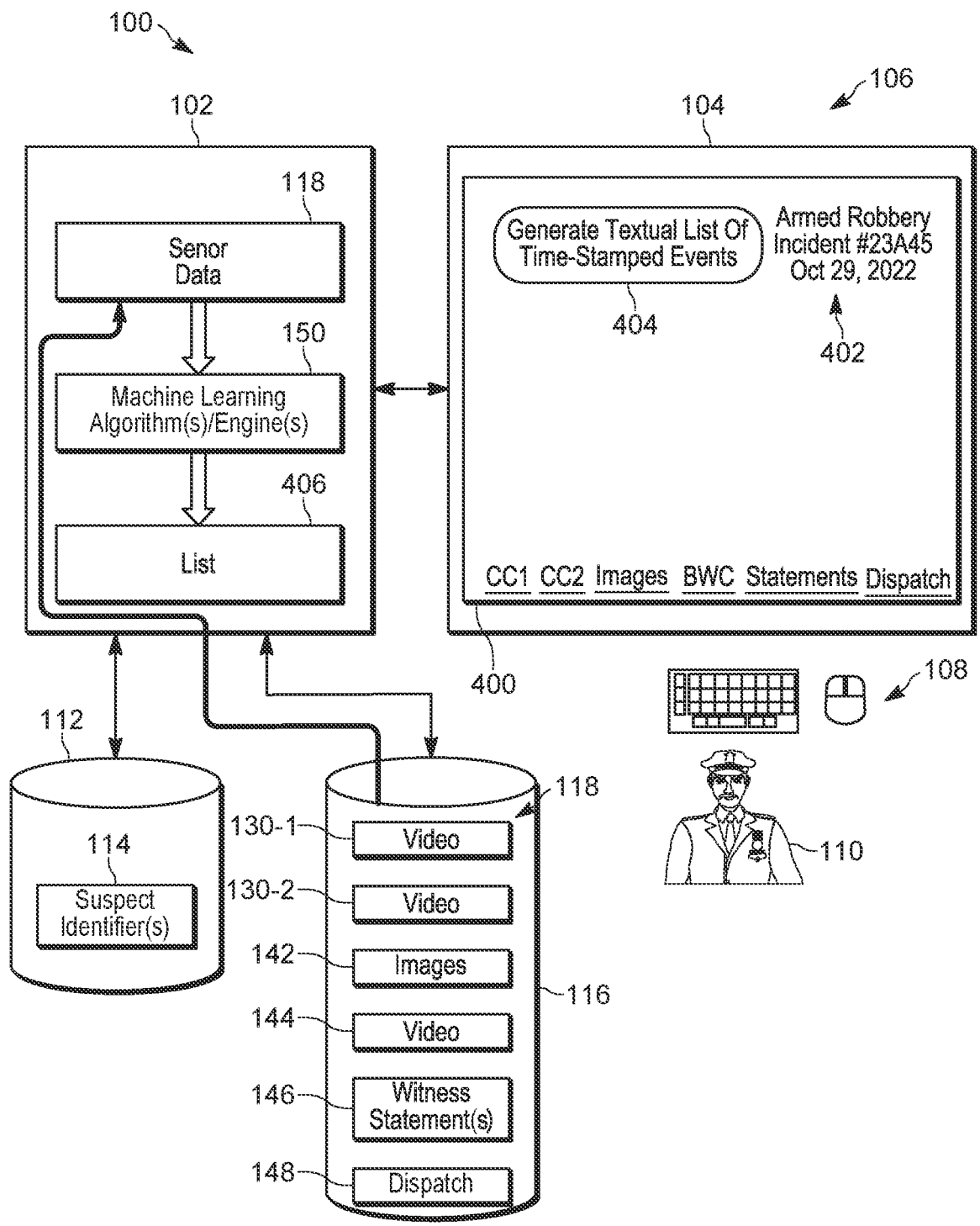
FIG. 4 depicts aspects of a method for reducing machine learning bias in machine learning generated textual lists of time-stamped events being implemented by a computing device of the system of FIG. 1, in accordance with some examples.

With attention first directed to FIG. 4, the officer 110 is depicted as operating the communication device 106 to generate a textual list of time-stamped events associated with the incident 120 via a graphic user interface (GUI) 400, which is identified via an incident identifier 402 in the GUI 400 (e.g. "Armed Robbery Incident #23A45 Oct. 29, 2022"), which may have been previously assigned to the incident 120, for example by the device 102, when the sensor data 118 as uploaded to the memory 116 and/or by a dispatch device and/or a public-safety answering point (not depicted) when the officer 110 was dispatched to the scene of the incident 120 and/or when a 911 call, and the like, was received at a dispatch and/or a public-safety answering point, the 911 call reporting the incident. As depicted, the incident identifier 402 includes a type of the incident (e.g. "Armed Robbery"), an alphanumeric identifier (e.g. "Incident #23A45") and a date ("Oct. 29, 2022") of the incident 120, though the incident identifier 402 may have any suitable format.

For example, the officer 110 may, after the interview 134, be using the communication device 106 to electronically generate an incident report associated with the incident 120, and may have operated the input device 108 at the communication device 106 to control the display screen 104 to render the GUI 400. The incident identifier 402 may be selected via a menu system (not depicted), and the like, of the GUI 400.

As depicted, the GUI 400 includes an electronic button 404 (e.g. labeled "Generate Textual List Of Time-Stamped Events"), which, when actuated causes the method 300 to be implemented. The electronic button 404 may be actuated via a pointing device of the input device 108, and the like.

However, in other examples, the electronic button 404 may be optional and the method 300 may be implemented when the incident identifier 402 is selected, and/or the method 300 may be implemented in any other suitable manner. Furthermore, the GUI 400 may include any other suitable electronic buttons, such as a refresh button, which may cause the textual list 406 to refresh for example due to further sensor data 118 associated with the incident 120 being added to the memory 116, though in other examples, the device 102 may automatically refresh the GUI 400 when further sensor data 118 associated with the incident 120 being added to the memory 116.

As further depicted in FIG. 4, when the method 300 is implemented, the device 102 retrieves the sensor data 118 from the memory 116, and the sensor data 118 is used as input to the machine learning algorithm 150, which may have been selected using an incident type of "armed robbery" as indicated by the incident identifier 402. It is further understood that the sensor data 118 may be stored at the memory 116 in association with the incident identifier 402 and hence the sensor data 118 may be retrieved from the memory 116 using the incident identifier 402.

While not depicted, the sensor data 118 may alternatively be converted into any suitable format for input to the machine learning algorithm 150. For example, audio of the incident 120 may be converted to text using a speech-to-text module of the application 222, and the like.

As depicted, the machine learning algorithm 150 receives the sensor data 118 as input and generates (e.g. at the block 302), as output, a textual list 406 of time-stamped events associated with the incident 120.

Figure 5:
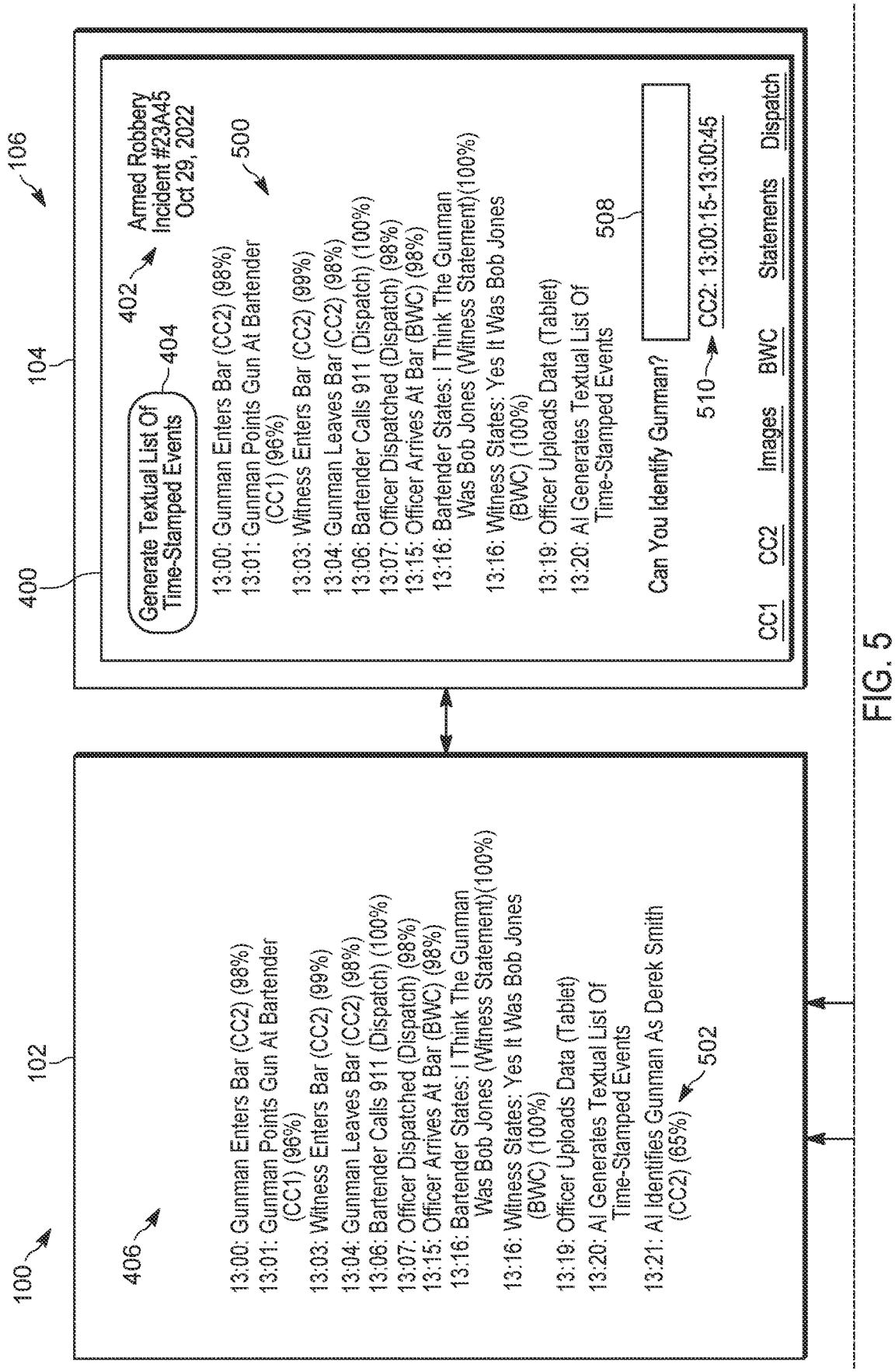
FIG. 5 depicts further aspects of the method for reducing machine learning bias in machine learning generated textual lists of time-stamped events, in accordance with some examples.
Figure 5:
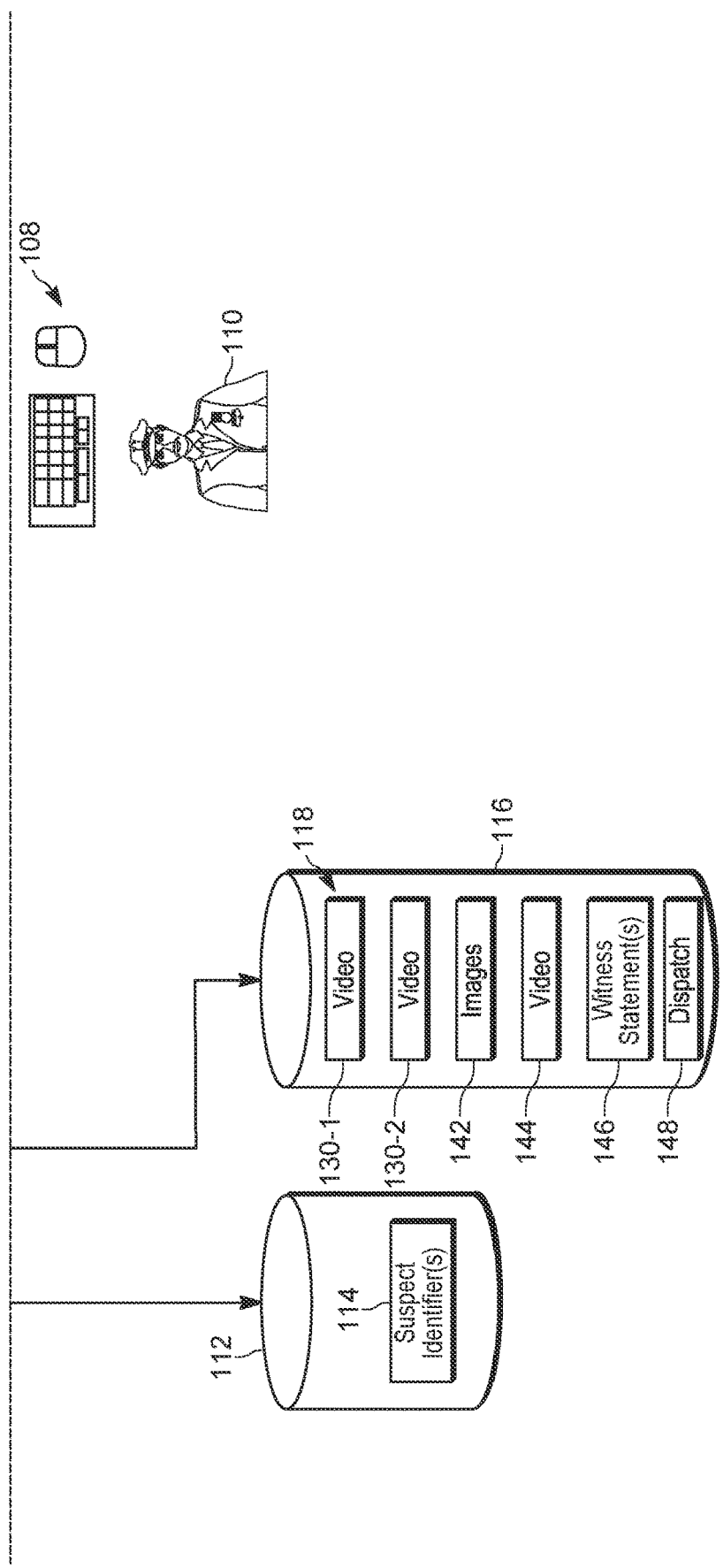

Attention is next directed to FIG. 5 which depicts an example of the textual list 406 at the device 102 as well as a rendered version 500 of the textual list 406 at the GUI 400.

Hereafter, in the textual list 406 and/or the GUI 400, "CC1" is understood to refer to the video 130-1 of the sensor data 118, "CC2" is understood to refer to the video 130-2 of the sensor data 118, "Images" is understood to refer to the images 142 of the sensor data 118, "BWC" is understood to refer to the body worn camera video 144 of the sensor data 118, "Statement" is understood to refer to the witness statements 146 of the sensor data 118, and "Dispatch" is understood to refer to the dispatch data 148 of the sensor data 118. Furthermore, in the GUI 400, respective underlines under "CC1", "CC2", "Images", "BWC", "Statements", and "Dispatch" is understood to indicate a link to respective sensor data 118. For example, in FIG. 5, "CC1", "CC2", "Images", "BWC", "Witness Statement", and "Dispatch", as underlined, are depicted at the bottom of the GUI 400 indicating that when the input device 108 is operated to select "CC1", "CC2", "Images", "BWC", "Witness Statement", or "Dispatch", the communication device 106 retrieves the respective sensor data 118 from the memory 116 and opens and/or plays the respective sensor data 118.

In the textual list 406, a time-stamped event is associated with a time, a textual indication of the event and optionally an indication of the sensor data 118 from which the time-stamped event was generated, and optionally a machine learning confidence level associated with the time-stamped event. For example, a first time stamped event has an associated time of "13:00" (e.g. understood to be on the date of the incident 120 of Oct. 29, 2022), a textual indication of the event of "Gunman enters bar", an indication of the sensor data 118 from which the time-stamped event was generated of "CC2", which indicates the video 130-2, and a machine learning confidence level of "98%".

It is further understood that the textual list 406 includes a time-stamped textual event associated with the upload of the sensor data 118 to the memory 116 (e.g. "13:19: Officer uploads data (Tablet)" which also indicates that the tablet 140, and the like, was used to upload the sensor data 118, and is also time-stamped) which does not include an indication of associated sensor data 118 or an associated machine learning score, for example as the upload occurred via the tablet 140 without necessarily any sensor data being generated, hence the machine learning algorithm 150 does not generate the particular time-stamped textual event and hence no associated machine learning score is generated.

Similarly, it is further understood that the textual list 406 includes a time-stamped textual event associated with the textual list 406 being generated (e.g. "13:20: AI generates Textual List Of Time-Stamped Events", with "AI" colloquially referring to "artificial intelligence" indicating the machine learning algorithm 150) which does not include an indication of associated sensor data 118 or an associated machine learning score, for example as the generation of the textual list 406 occurred without necessarily any sensor data being generated, hence the machine learning algorithm 150 does not generate the particular time-stamped textual event and hence no associated machine learning score is generated.

In particular, however, the textual list 406 includes a time-stamped textual event 502 of "13:21: AI identifies gunman as Derek Smith (CC2) (65%)". In particular, the machine learning algorithm 150 (e.g. the "AI") is understood to have received the video 130-2 (e.g. "CC2") as input and compared a face of the gunman 122 in the video 130-2 with the suspect identifiers 114, for example using any suitable video analytics. In particular, the machine learning algorithm 150 has determined, with a 65% machine learning confidence score, that the face of the gunman 122 matches a face of a suspect "Derek Smith" having feature vectors stored in an associated suspect identifier 114. As has been previously described, feature vectors of the face of the gunman 122 may be extracted from the video 130-2 for comparison with feature vectors of the suspect identifiers 114.

Attention is next directed to the rendered version 500 of the textual list 406 at the GUI 400, in which the time-stamped events match the textual list 406 as determined by the device 102, except for the time-stamped textual event 502.

Rather, as described herein, the time-stamped events associated with respective machine learning confidence scores are compared to the threshold confidence score, for example of "95%". Time-stamped events having respective machine learning confidence scores that are less than the threshold confidence score are redacted in the textual list 406 and replaced with a respective field for receiving input, as rendered at the display screen 104 for example as the rendered version 500 of the textual list 406.

However, it is understood that the replacing and redacting may not occur in the textual list 406 as stored at and/or generated at the device 102; rather, the replacing and redacting is understood to occur at the display screen 104, in the rendered version 500 of the textual list 406. While the replacing and redacting may occur in the textual list 406 as stored at and/or generated at the device 102, the device 102 may nonetheless store time-stamped events that are redacted and replaced for later retrieval.

As depicted, all of the time-stamped events depicted in FIG. 5 have an associated machine learning confidence score of greater than "95%", except for the time-stamped textual event 502 that has a machine learning confidence score of "65%", which is less than the threshold confidence score of "95%". As such, in the rendered version 500 of the textual list 406, time-stamped textual event 502 is redacted and replaced with a field 508 (e.g. at the block 304 of the method 300), along with a question of "Can you identify the gunman?". Adjacent the field 508 is a link 510 to a portion of the video 130-2 in which the machine learning algorithm 150 identified the gunman 122. In particular, the link 510 comprises "CC2: 13:00:15-13:00:45", which, when actuated, will cause a portion of the video 130-2 to play at the communication device 106, from a time 13:00:15 to a time 13:00:45, however, other portions of the video 130-2 may be played.

As such, the officer 110 may review the video 130-2 to identify the gunman 122, as well other sensor data 118, accessible, for example, via the links via the bottom of the GUI 400, and the officer 110 may further review the rendered version 500 of the textual list 406 for other indicators of the identity of the gunman 122. For example, time-stamped events at a time "13:16" indicate that both the bartender 124 and the witness 126 identified the gunman 122 as "Bob Jones" (e.g. and not "Derek Smith"). Put another way, in this example, the gunman 122 may be previously known to the bartender 124 and the witness 126, such that the recognized the gunman 122: in other examples (not depicted), the officer 110 have shown photos of suspects that included the gunman 122, and the bartender 124 and the witness 126 may have identified the gunman 122 from the photos. The officer 110 may further review any other databases available to the officer 110 (e.g. public-safety databases, and the like, such as drivers license databases which may include images of "Bob Jones") and/or perform any other suitable analysis and/or investigation, and determine that the gunman is "Bob Jones".

Figure 6:
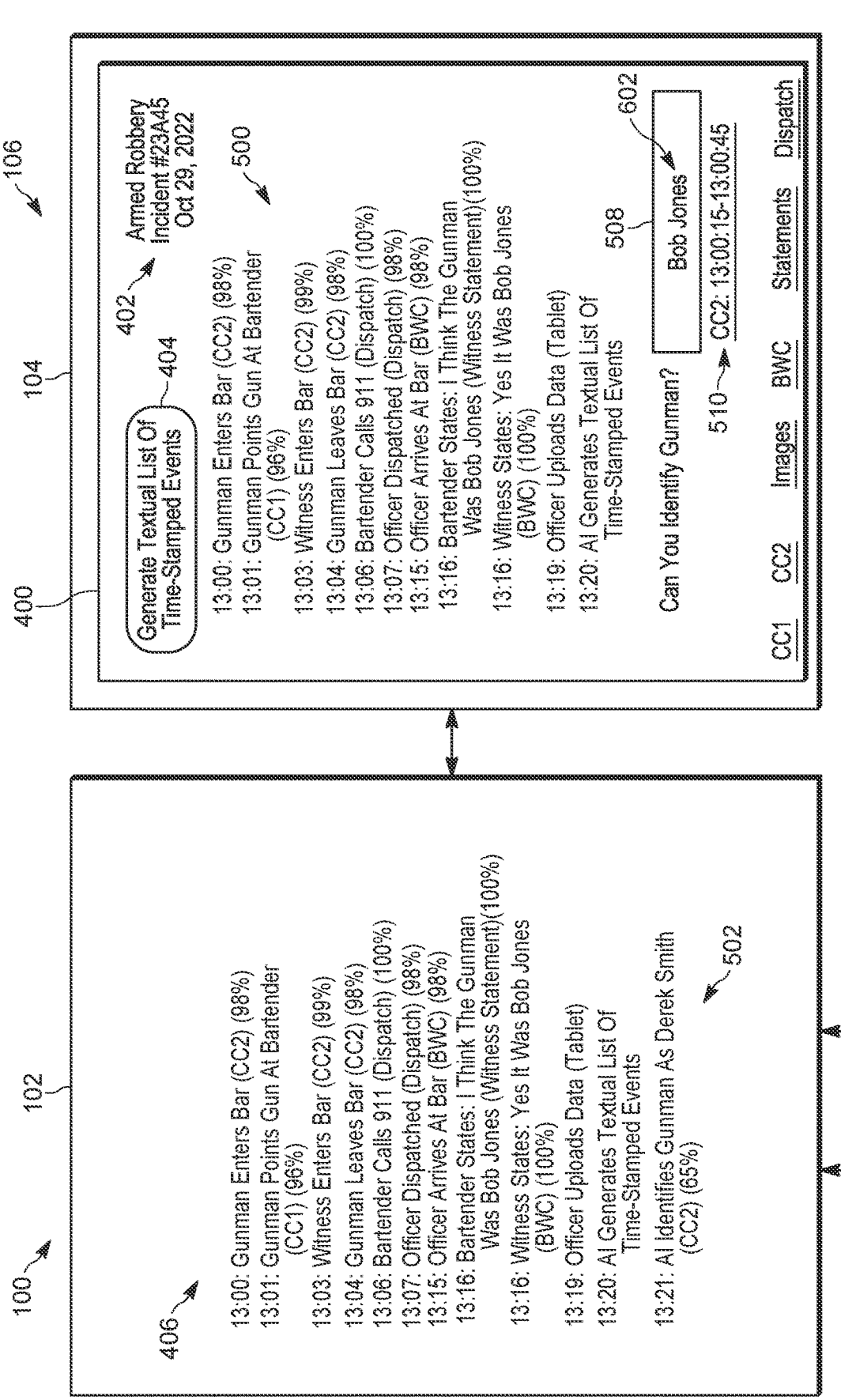
FIG. 6 depicts further aspects of the method for reducing machine learning bias in machine learning generated textual lists of time-stamped events, in accordance with some examples.

With reference to FIG. 6, which follows in time from FIG. 5, input 602 of "Bob Jones" is received at the field 508 (e.g. at the block 306 of the method 300).

Figure 7:
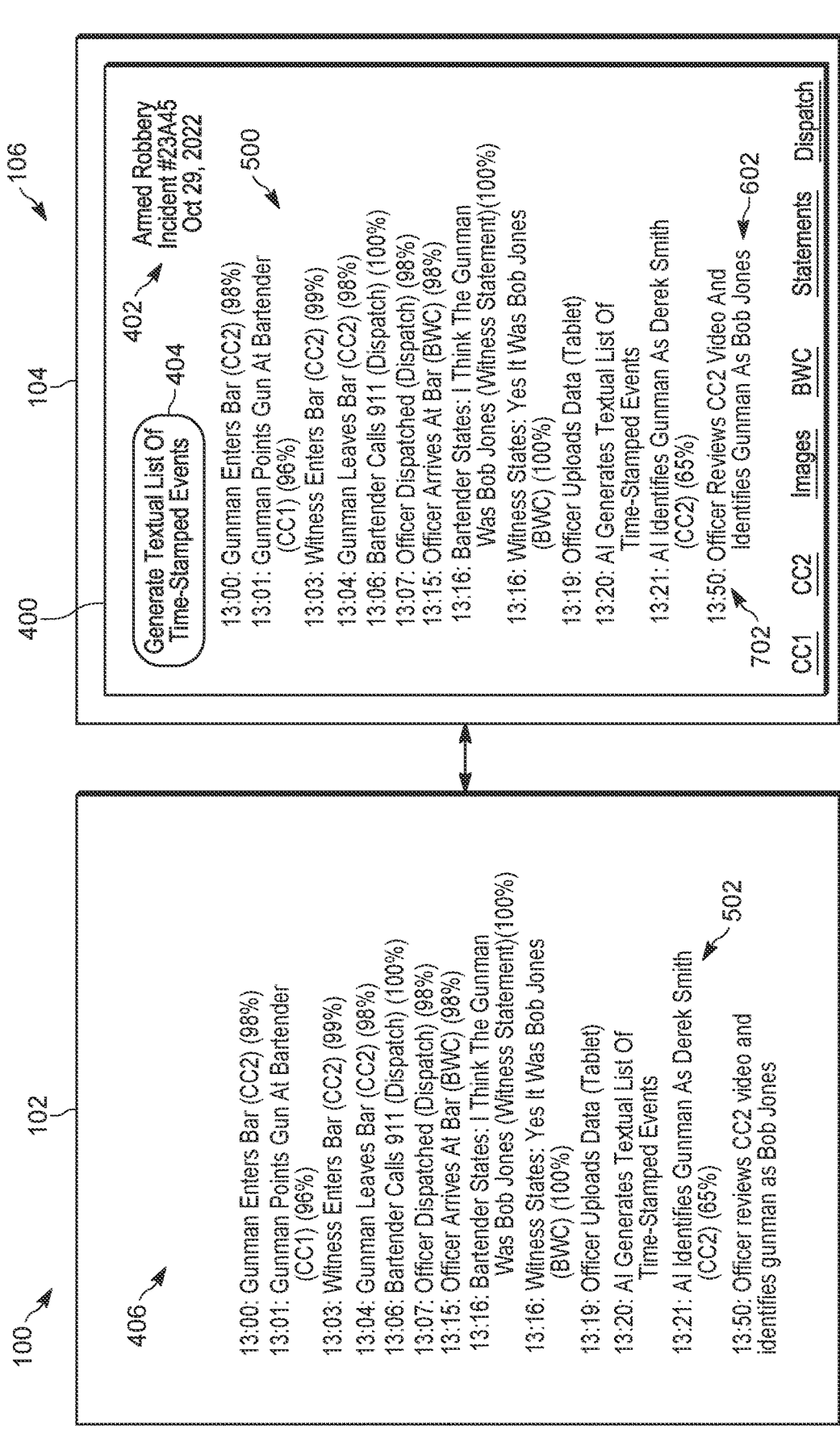
FIG. 7 depicts further aspects of the method for reducing machine learning bias in machine learning generated textual lists of time-stamped events, in accordance with some examples.
Figure 7:
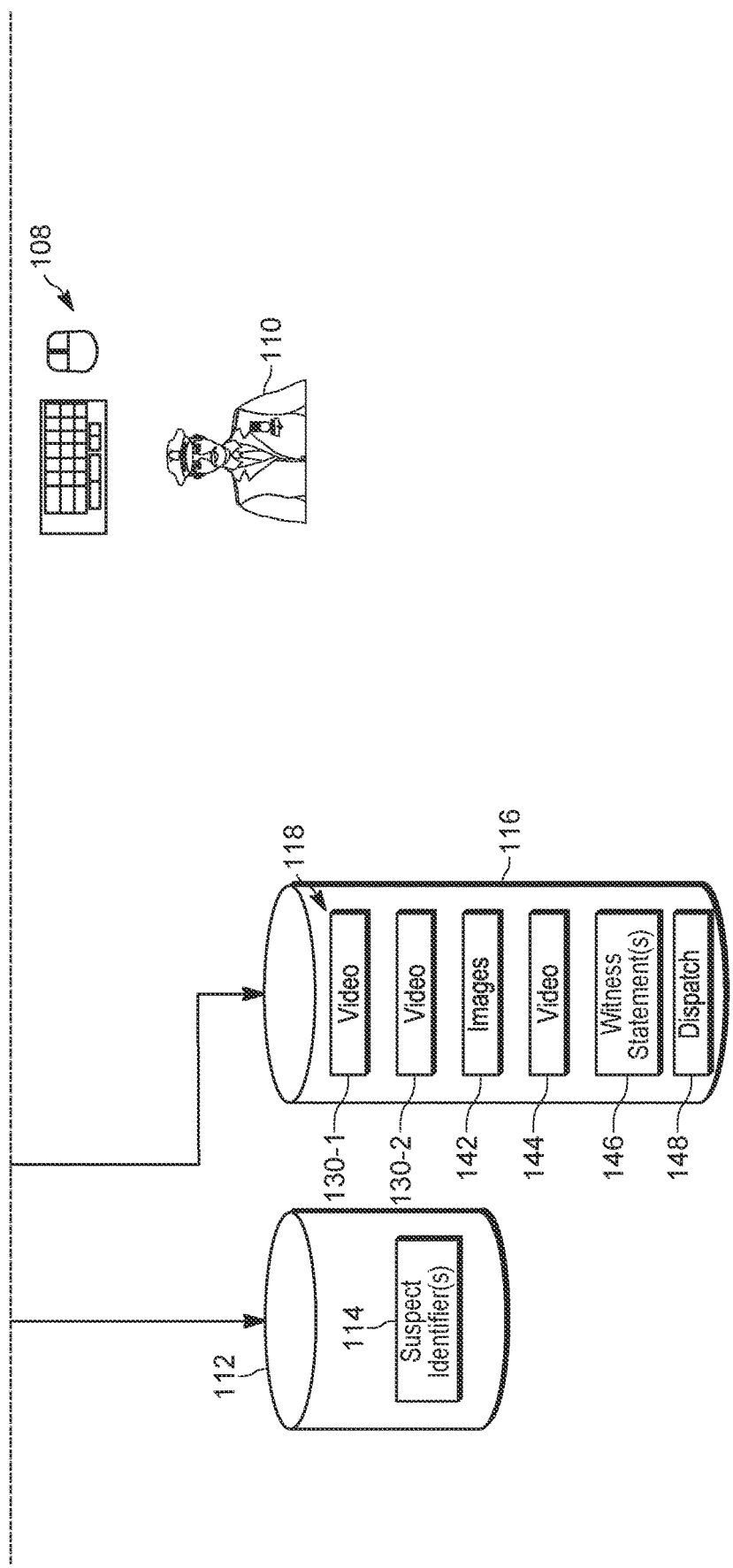

With reference to FIG. 7, which follows in time from FIG. 6, after receiving the input 602, the given time-stamped event 502 is un-redacted (e.g. at the block 308 of the method 300) in the rendered version 500 of the textual list 406, and the input 602 received at the field 508 and the given time-stamped event 502 are rendered at the display screen 104. Furthermore, the input 602 being received at the field 508 is rendered in another time-stamped event 702, time-stamped with a time at which the input 602 was received of "13:50: Officer reviews CC2 video and identifies gunman as Bob Jones". In particular the time-stamped event 702 replaces the field 508 (e.g. and the question "Can you identify the gunman?").

Figure 8:
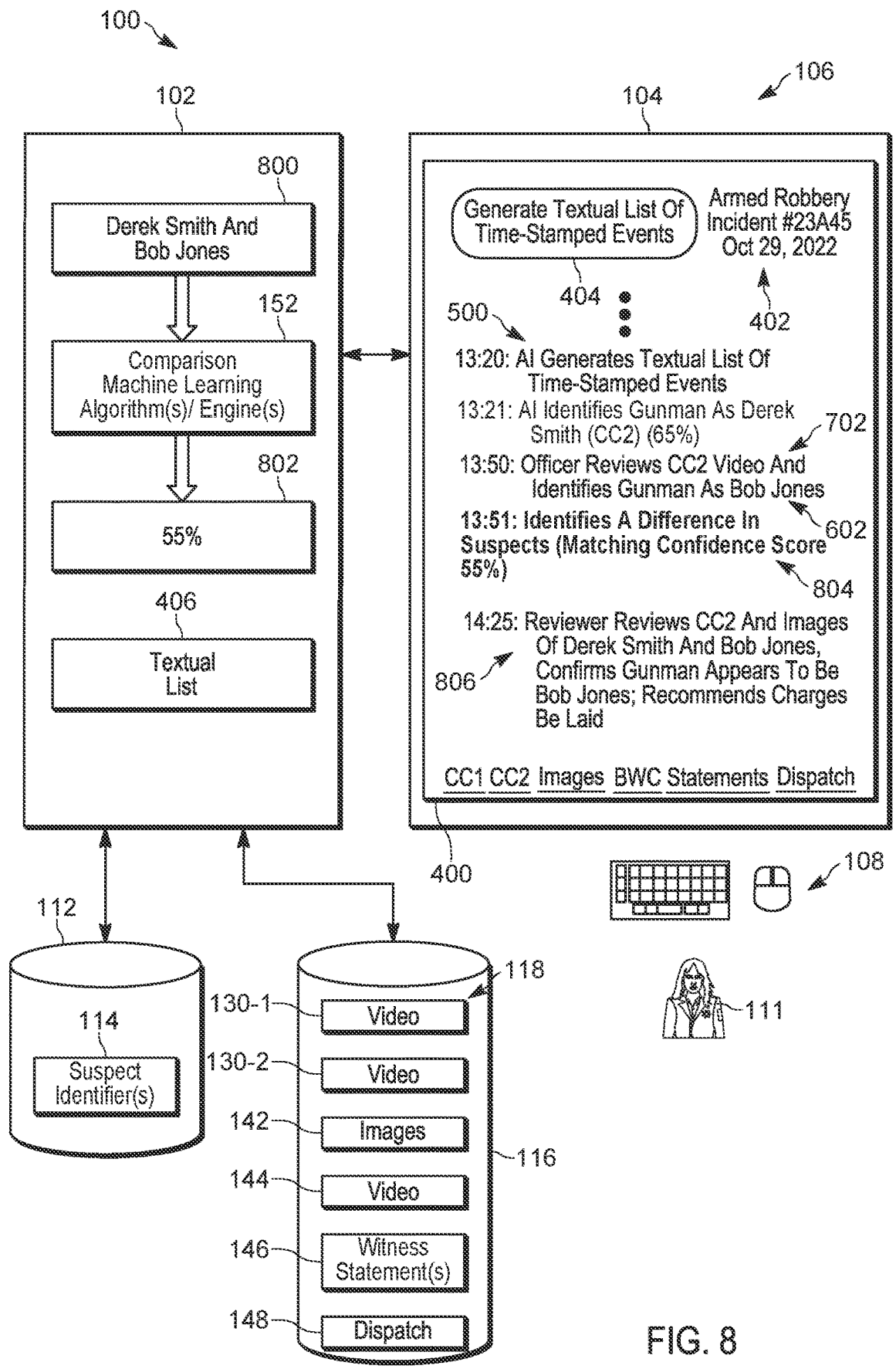
FIG. 8 depicts further aspects of the method for reducing machine learning bias in machine learning generated textual lists of time-stamped events, in accordance with some examples.

Attention is next directed to FIG. 8, which follows in time from FIG. 7, and depicts further aspects of the method 300. While details of the textual list 406 are not depicted at the device 102, they are nonetheless understood to be present. Similarly, while not all time-stamped events of the rendered version 500 of the textual list 406 are depicted at the display screen 104, they are nonetheless understood to be present, as indicated, for example, by ellipses " . . . ".

As depicted, the comparison machine learning algorithm 152 is receiving, as input, data 800 indicative of "Derek Smith" and "Bob Jones", such as respective suspect identifiers 114 and/or images thereof (e.g. an image of "Bob Jones" may have been retrieved from a drivers license database, and the like, and converted to suspect identifiers such as field vectors, and the like).

As depicted, the comparison machine learning algorithm 152 receives the data 800 and outputs a matching confidence score 802 of whether or not the data 800 indicative of "Derek Smith" and "Bob Jones": as depicted, the matching confidence score is "55%". Such a matching confidence score 802 may be based on respective images of "Derek Smith" and "Bob Jones" (e.g. where there may be a partial match) as well as a comparison of the names "Derek Smith" and "Bob Jones" (e.g. where there may be no match).

However, such a comparison may be based on other factors: for example, when records associated with "Derek Smith" and "Bob Jones" are available (e.g. the data 800 may further comprise such records which may be stored at the memory 112 and/or another memory), such as driver's license records, criminal records, and the like, that include addresses, physical characteristics (e.g. such as height, weight, eye color, and the like), driving history, and the like, the records may be compared with each other to determine the matching confidence score 802. Such a comparison may include comparing using semantic processing, and the like, for example to compare textual descriptions of driving histories, criminal events, and the like. For example, "Derek Smith" and "Bob Jones" may be the same person (e.g. with "Derek Smith" and "Bob Jones" being aliases for that person), and such a comparison may indicate whether they are the same person.

In yet further examples, However, such a comparison may be based on comparing the aforementioned records (e.g. driver's license records, criminal records, and the like) with the textual list 406. For example, while not depicted, the textual list 406 may include a physical description of the gunman 122 by the bartender 124 and/or the witness 126 which may be compared with the aforementioned records (e.g. using semantic processing, and the like).

Hence, the data 800 may include any suitable information to compare "Derek Smith" and "Bob Jones", with the comparison machine learning algorithm 152 adapted accordingly.

Furthermore, different types of comparisons performed by the comparison machine learning algorithm 152 may be weighted. Put another way, the matching confidence score 802 may be determined from a plurality of matching confidence scores using comparisons of different data types. For example, an image comparison of "Derek Smith" and "Bob Jones" may determine a 61% match and be weighted at 0.9, and a name comparison may determine a 0% match of "Derek Smith" and "Bob Jones" and be weighted at 0.1, resulting in a matching confidence score 802 of "55%" (e.g. (61%×0.9)+(0%×0.1)=55% (e.g. rounded up)).

However, using the same weights, if "Derek Smith" had a name of "Derek Jones" but with a same suspect identifier 114 (e.g. a same appearance and/or image), an image comparison of "Derek Jones" and "Bob Jones" may determine a 61% match and be weighted at 0.9, and a name comparison may determine a 50% match of "Derek Jones" and "Bob Jones" (e.g. as the last names of "Jones" match) and be weighted at 0.1, resulting in a matching confidence score 802 of "60%" (e.g. (61%×0.9)+(50%×0.1)=60% (e.g. rounded up)).

However, any suitable weighting scheme is within the scope of the present specification.

Regardless, the comparing of the data 800 indicative of "Derek Smith" and "Bob Jones" is understood to comprise, and/or be indicative of, a comparison of the input 602 received at the field 508 and the given time-stamped event 502.

Presuming the matching confidence score 802 of "55%: is below a threshold matching score (e.g. "90%"), the device 102 provides a notification thereof at a notification device, such as the display screen 104. In particular, as depicted, the device 102 adds another given time-stamped event 804 to the textual list 406, as depicted in the rendered version 500 of the textual list 406 in FIG. 8, of "13:51: IDENTIFIES A DIFFERENCE IN SUSPECTS (Matching Confidence Score 55%)".

As such, as depicted, in FIG. 8, the reviewer 111 may operate the communication device 106, and/or another communication device which also renders the rendered version 500 of the textual list 406, to review the video 130-2, as well as any other sensor data 118 and/or any other data available to the reviewer 111 (e.g. public-safety databases, and the like), to determine whether or not the gunman 122 is "Derek Smith" or "Bob Jones" (or someone else). In particular, as depicted, the reviewer 111 is understood to have operated the communication device 106 (or another communication device) to indicate that the gunman 122 is "Bob Jones" and has recommended charges be laid: while such operation is not depicted, such operation may occur via any suitable menu system, providing of fields into which the reviewer 111 may enter data, and the like. In particular, the device 102 has added a time-stamped event 806 to the rendered version 500 of the textual list 406 of "14:25: Reviewer reviews CC2 and images of Derek Smith and Bob Jones, confirms gunman appears to be Bob Jones: recommends charges be laid". It is understood that the time-stamped events 804, 806 are also added to the textual list 406 at the device 102.

Attention is next directed to FIG. 9, which depicts a machine learning feedback loop 900, to better train the machine learning algorithm 150 to identify suspects in sensor data. In particular, the sensor data 118, and/or a portion thereof, such as the video 130-2, and a suspect identifier 114 associated with "Derek Smith" is provided to the machine learning algorithm 150 as machine learning feedback 902, the machine learning algorithm 150 being operated in a training mode during implementation of the machine learning feedback loop 900. As depicted, the sensor data 118 may comprise training input, and the suspect identifier 114 may comprise training output, the suspect identifier 114 labeled with a score 904 of "0" as the sensor data 118 as it has been determined that the sensor data 118 does not represent "Derek Smith", as determined by the officer 110 and/or as confirmed by the reviewer 111. As such, it is understood that the score 904 of "0" may be generated from input received via the officer 110 and/or the reviewer 111 operating the communication device 106, and/or another communication device, and the like. Hence, in implementing the machine learning feedback loop 900 with the depicted feedback 902, machine learning bias in the machine learning algorithm 150 may be reduced.

While the provided example has been described with respect to suspect identification, other types of time-stamped events may be redacted and replaced with a field. For example, in video collected at an incident scene in which a first person fell from a roof, and a second was person nearby, the machine learning algorithm 150 may determine with a "75%" machine learning confidence score that the second person pushed the first person, and provide a time-stamped event of the determination accordingly. However, as the "machine learning confidence score" of "75%" may be less than a threshold confidence score of "95%", and/or as the time-stamped event includes identification of an action that includes a specific type of crime (e.g. such as homicide), the time-stamped event may be redacted and replaced with a field, similar to the field 508, and the like, and the officer 110 may enter a determination of whether or not the second person pushed the first person. For example, the officer 110 may determine from video, witness statements, and the like, that the first person was committing suicide and the second person was attempting to save the first person. Again, any suitable data indicating that the determination of the machine learning algorithm 150 incorrectly determined that the second person pushed the first person may be provided to the machine learning algorithm 150 to better train the machine learning algorithm to better identify crimes and/or to reduce machine learning bias of the machine learning algorithm 150.

Returning briefly to FIG. 5, it is understood that a time-stamped event of "Gunman points gun at bartender (CC1) (96%)" was also generated, which identifies a specific crime perpetrated by the gunman 122. However, the associated machine learning confidence score of "96%" is not below the threshold confidence score of "95%", the redacting and replacing of the block 304 of the method 300 does not occur. However, in other examples, the threshold confidence score of "95%" may be adjusted to, for example, "97%" such the redacting and replacing of the block 304 of the method 300 may occur with regards to the time-stamped event of "Gunman points gun at bartender (CC1) (96%)".

Attention is next directed to FIG. 10A and FIG. 10B which depicts alternative and/or additional examples of fields 1002, 1004 which may be used to replace a given time-stamped event, in the textual list 406, that has a respective machine learning confidence score that is less than a threshold confidence score. Put another way, instead of the field 508, and/or in addition to the field 508, one or more of the fields 1002, 1004 may be provided.

For example, FIG. 10A depicts a combination of fields 1002 that may include a multiple-choice selection field 1006 and a slider field 1008. While both fields 1006, 1008 are depicted in association with a question of "How likely do you think Derek Smith is the gunman?", it is understood that only one of the fields 1006, 1008 may be provided. It is further understood that the question of "How likely do you think Derek Smith is the gunman?" was generated from the given time-stamped event 502.

The multiple-choice selection field 1006 provides a plurality of selectable options (e.g. selectable via the input device 108) of "Very Likely", "Likely", "Neutral", "Unlikely", and "Very Unlikely", to indicate how likely the officer 110 (e.g. and/or the reviewer 111) thinks that Derek Smith is the gunman 122, which may be selected via respective checkboxes: as depicted the option of "Very Unlikely" is selected.

The slider field 1008 may provide selectable options similar to the selectable options of the multiple-choice selection field 1004, but in a slider format. For example, a slider 1009 may be operated by the input device 108 to select a selectable option from "Very Likely", "Likely", "Neutral", "Unlikely", and "Very Unlikely". As depicted, the option of "Very Unlikely" is selected.

When an option is selected using one or more of the fields 1006, 1008, an associated "human" confidence score may be determined. For example, the options of "Very Likely", "Likely", "Neutral", "Unlikely", and "Very Unlikely" may be associated with respective human confidence scores that indicate how likely the officer 110 (e.g. and/or the reviewer 111) thinks that Derek Smith is the gunman 122. In particular, the option of "Very Likely" may be associated with a highest human confidence score (e.g. such as "100%", amongst other possibilities) that the officer 110 (e.g. and/or the reviewer 111) thinks that Derek Smith is the gunman 122, and the option of "Very Unlikely" may be associated with a lowest human confidence score (e.g. such as "0%", amongst other possibilities) that the officer 110 (e.g. and/or the reviewer 111) thinks that Derek Smith is the gunman 122. The options of "Likely", "Neutral" and "Unlikely" may be associated with respective human confidence scores between the highest and lowest human confidence scores (e.g. such as, respectively, "75%", "50%" and "25%", amongst other possibilities).

The human confidence score may be compared to the machine learning confidence score used to identify a likelihood of a match or a difference between input received at one or more of the fields 1006, 1008 and the given time-stamped event 502.

For example, the input received at the fields 1006, 1008 may indicate whether or not the officer 110 believes that "Derek Smith" is the gunman 122 and such information may be added to the data 800 (and/or used in the data 800 as the primary and/or only data compared with the given time-stamped event 502).

Next described is one example scheme for assigning a matching confidence score to the input received at the fields 1006, 1008 and the given time-stamped event matching.

For example, a matching confidence score may be determined from:

$$MCS = MLCL \times HCS \times 100\% \qquad \text{Equation (1)}$$

In Equation (1), "MCS" is the matching confidence score, "MLCL" is the machine learning confidence level (e.g. of "65%" associated with the given time-stamped event 502) and "HCS" is the human confidence score associated with a selectable option selected using one or more of the fields 1006, 1008. While the "MLCL" and "HCS" in Equation (1) may both be expressed in percentage (in which case multiplying by "100%" may be unnecessary), "MLCL" and "HCS" may be expressed fractionally (e.g. respectively 0.65 and 1 or 0.75 or 0.50 or 0.25 or 0), and/or in any other suitable manner.

Using the aforementioned respective human confidence scores of 100%, 75%, 50%, 25% and 0% for the options of "Very Likely", "Likely", "Neutral", "Unlikely", and "Very Unlikely", and a machine learning confidence level of 65%, and using Equation (1), for the options of "Very Likely", "Likely", "Neutral", "Unlikely", and "Very Unlikely" respective matching confidence scores of "65%, "48.75%, "32.5%", "16.25" and "0%" may be determined such that as the likelihood that the officer 110 and/or the reviewer 111 believes that "Derek Smith" is the gunman 122 decreases, a matching confidence score decreases. Furthermore, a matching confidence score using such a scheme may be used to replace the confidence matching score of the given time-stamped event 804 depicted in FIG. 8.

It is further understood that any suitable scheme for determining a matching confidence score is within the scope of the present specification.

For example, a binary scheme may be used to determine a matching confidence score. For example, when the options of "Very Likely" or "Likely" are selected, a matching confidence score may be "1" (e.g. as the input received at the fields 1006, 1008 "agrees" with the finding by the machine learning algorithm 150 that that the gunman 122 is likely Derek Smith). Conversely, when the options of "Neutral", "Unlikely" or "Very Unlikely" are selected, a matching confidence score may be "0" (e.g. as the input received at the fields 1006, 1008 "disagrees" with the finding by the machine learning algorithm 150 that that the gunman 122 is likely Derek Smith).

In yet another weighting scheme, a human confidence score associated with a selected option using one or more of the fields 1006, 1008 may be compared to the machine learning confidence level using the following scheme:

for $HCS > MLCS, MCS = MLCL/HCS \times 100\%$    Equation (2)

for $HCS < MLCS, MCS = HCS/MLCL \times 100\%$    Equation (3)

When the human confidence score equals the machine learning confidence level, either of Equation (2) or Equation (3) may be used. Using the aforementioned respective human confidence scores of 100%, 75%, 50%, 25% and 0% for the options of "Very Likely", "Likely", "Neutral", "Unlikely", and "Very Unlikely", and a machine learning confidence level of 65%, and using Equations (2), and (3) for the options of "Very Likely", "Likely", "Neutral", "Unlikely", and "Very Unlikely" respective matching confidence scores of "65%, "86.7%, "76.9%", "38.4" and "0%" may be determined such that as the likelihood that the officer 110 and/or the reviewer 111 believes that "Derek Smith" is the gunman 122 differs from 65% (e.g. as determined by the machine learning algorithm 150), a matching confidence score decreases; for example, when the human confidence score equals the machine learning confidence level, the matching confidence score is 100%. Put another way, using this scheme, the further a human confidence score is from a machine learning confidence level the lower the matching confidence score. Furthermore, a matching confidence score using such a scheme may be used to replace the confidence matching score of the given time-stamped event 804 depicted in FIG. 8.

Indeed, any suitable scheme may be used in which the further a human confidence score is from a machine learning confidence level the lower the matching confidence score.

In some examples, a comparison between the given time-stamped event 504 and the input received at the fields 1006, 1008 may be based solely on the input received at the fields 1006, 1008 and the given time-stamped event 502 using the aforementioned assigned confidence matching score of the options of the fields 1006, 1008. In other examples, a comparison between the given time-stamped event 504 and the input received at the fields 1006, 1008 may be based on the input received at the fields 1006, 1008 and any of data described with respect to the data 800 above using, for example, any suitable weighting scheme. For example, while in the fields 1006, 1008 "Bob Jones" is not identified, the fields 1006, 1008 may be combined with the field 508 such that the officer 110 may identify another suspect using the field 508 and images of, and/or suspect identifiers 114 associated with, "Bob Jones" and "Derek Smith" may be compared.

FIG. 10B depicts a combination of fields 1004 that may include a multiple-choice selection field 1010 and field 1012 for receiving textual input, similar to the field 508. While both fields 1010, 1012, are depicted in association with a question of "Based on your investigation, who is the gunman?", it is understood that only one of the fields 1010, 1012 may be provided.

The multiple-choice selection field 1010 provides a plurality of selectable options (e.g. selectable via the input device 108) to indicate suspects that the officer 110 (e.g. and/or the reviewer 111) may determine is the gunman 122, which may be selected via respective checkboxes. As depicted, the options include "Derek Smith", "Bob Jones", "Other Suspect" and "Further Investigation Needed". As depicted the option of "Bob Jones" is selected.

It is further understood that the option of "Derek Smith" of the multiple-choice selection field 1010 may be generated from the given time-stamped event 502. The option of "Other suspect" and "Further Investigation Needed" may be generic options always provided in the multiple-choice selection field 1010. The option of "Bob Jones" may be generated from the textual list 406, for example presuming the textual list 406 includes some reference to "Bob Jones" (e.g. as depicted herein). However, the option of "Bob Jones" may alternatively be determined by comparing an image of the gunman 122 with the suspect identifiers 114 (e.g. an image of the gunman 122 may match an image of "Bob Jones" indicated by a suspect identifier 114, and the like).

Furthermore, similar to the options of the fields 1006, 1008, the options of the field 1010 may be assigned a human confidence score, for example relative to the gunman 122 being "Derek Smith". For example, the option of "Derek Smith" may be assigned a matching score of "100%", indicating that officer 110 and/or the reviewer 111 believes the likelihood that the gunman 122 is "Derek Smith" is "100%".

Conversely, the options of "Bob Jones" and "Other" may be assigned a human confidence score of "0%" indicating that officer 110 and/or the reviewer 111 believes the likelihood that the gunman 122 is "Derek Smith" is 0%.

In some examples, the option of "Further Investigation Needed" may also be assigned a matching score of "0%". However, in other examples, the option of "Further Investigation Needed" may also be assigned a matching score of "50%", indicating that officer 110 and/or the reviewer 111 believes the likelihood that the gunman 122 is "Derek Smith" is "50%".

A matching confidence score may be determined based on a selected option using any of the same and/or similar schemes as described with respect to the fields 1006, 1008 and/or any other suitable scheme.

As depicted, input has been received at the field 1012 indicating why the officer 110 (e.g. and/or the reviewer 111) has selected Bob Jones. In particular, the input of the field 1012 comprises "Bob Jones was identified by witnesses and I reviewed crime scene video and Bob Jones' driver's license photo and confirmed the gunman appears to be Bob Jones".

When an option of the field 1010 is selected, an associated confidence matching score may be determined, as described above, which may be adjusted based on the input received at the field 1012.

For example, input of the field 1012 of "Bob Jones was identified by witnesses and I reviewed crime scene video and Bob Jones' driver's license photo and confirmed the gunman appears to be Bob Jones" may indicate that the officer 110 believes, to a 90% confidence, that the gunman 122 is Bob Jones. Such a confidence may be determined from semantic processing of the input of the field 1012. In other examples, the input of the field 1012 may indicate a confidence, such as "Bob Jones was identified by witnesses and I reviewed crime scene video and Bob Jones' driver's license photo and am 90% sure the gunman is Bob Jones".

Hence, when the option of "Bob Jones" is selected at the field, and the input received at the field 1012 indicates a 90% confidence that the gunman 122 is "Bob Jones (e.g. as determined via one or more of the machine learning engines 150, 152), rather than assign a human confidence score of "0%" to the selections of the officer 110 and/or the reviewer 111 believing the likelihood that the gunman 122 is "Derek Smith", a human confidence score of "10%" may be assigned (e.g. 100%-90%). However, any suitable adjustment scheme is within the scope of the present specification.

Hence, using any of the same and/or a similar schemes as described with respect to the fields 1006, 1008, a matching confidence score may be determined, which may be used to replace the confidence matching score of the given time-stamped event 804 depicted in FIG. 8.

In some examples, a comparison between the given time-stamped event 502 and the input received at the fields 1010, 1012 may be based solely on the input received at the fields 1010, 1012 and the given time-stamped event 502 using the aforementioned assigned confidence matching score of the options of the fields 1010 adjusted according to the input received at the field 1012. In other examples, a comparison between the given time-stamped event 504 and the input received at the fields 1010, 1012 may be based on the input received at the fields 1010, 1012 and any of data described with respect to the data 800 above using, for example, any suitable weighting scheme.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, cannot implement a machine learning model and/or algorithm, nor implement a machine learning model and/or algorithm feedback loop, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

Furthermore, a device provided herein may include a housing that contains at least some of the components of the device: however in some alternative examples a device may include components not all contained in a single housing, but rather within two or more different housings.

The terms "coupled", "coupling" or "connected" as used herein can have several different meanings depending on the context, in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    generating, via a computing device, via one or more machine learning algorithms, using sensor data, a textual list of time-stamped events associated with an incident, the sensor data related to the incident and generated by sensors, one or more of the time-stamped events in the textual list associated with respective machine learning confidence scores;
    for a given time-stamped event, in the textual list, having a respective machine learning confidence score that is less than a threshold confidence score, redacting, via the computing device, the given time-stamped event in the textual list of time-stamped events and replacing the given time-stamped event in the textual list with a field for receiving input, the textual list of time-stamped events rendered at a display screen with the given time-stamped event in the textual list replaced with the field for receiving the input;
    receiving, via the computing device, input at the field;
    after receiving the input, un-redacting the given time-stamped event; and
    rendering, via the computing device, at a display screen, the input received at the field and the given time-stamped event.

2. The method of claim 1, further comprising:
    based on determining that the input received at the field and the given time-stamped event differ, providing a notification thereof at a notification device.

3. The method of claim 1, further comprising:
    comparing the input received at the field and the given time-stamped event;
    assigning a matching confidence score to the input and the given time-stamped event matching; and
    based on the matching confidence score being below a threshold matching score, providing a notification thereof at a notification device.

4. The method of claim 1, further comprising:
    generating a respective time-stamped event for the redacting or the receiving the input; and
    including the respective time-stamped event in the textual list of time-stamped events as rendered at the display screen.

5. The method of claim 1, further comprising:
    providing, with the field, access to respective sensor data used to generate the given time-stamped event.

6. The method of claim 1, further comprising:
providing, with the field, an identifier of respective sensor data used to generate the given time-stamped event.

7. The method of claim 1, further comprising:
categorizing the given time-stamped event; and
performing the redacting and the replacing based on the given time-stamped event being in a given category.

8. The method of claim 1, further comprising:
categorizing the given time-stamped event, wherein the threshold confidence score is selected based on a category of the given time-stamped event.

9. The method of claim 1, further comprising:
selecting the one or more machine learning algorithms based on a type of the incident.

10. The method of claim 1, wherein the field comprises a blank field, a multiple-choice selection field, or a slider field.

11. A device comprising:
a controller communicatively coupled to a display screen and an input device, the controller configured to:
generate, via one or more machine learning algorithms, using sensor data, a textual list of time-stamped events associated with an incident, the sensor data related to the incident and generated by sensors, one or more of the time-stamped events in the textual list associated with respective machine learning confidence scores;
for a given time-stamped event, in the textual list, having a respective machine learning confidence score that is less than a threshold confidence score, redact the given time-stamped event in the textual list of time-stamped events and replace the given time-stamped event in the textual list with a field for receiving input, the textual list of time-stamped events rendered at the display screen with the given time-stamped event in the textual list replaced with the field for receiving the input;
receive, via an input device, input at the field;
after receiving the input, un-redact the given time-stamped event; and
render, at the display screen, the input received at the field and the given time-stamped event.

12. The device of claim 11, wherein the controller is further configured to:
based on determining that the input received at the field and the given time-stamped event differ, provide a notification thereof at a notification device.

13. The device of claim 11, wherein the controller is further configured to:
compare the input received at the field and the given time-stamped event;
assign a matching confidence score to the input and the given time-stamped event matching; and
based on the matching confidence score being below a threshold matching score, provide a notification thereof at a notification device.

14. The device of claim 11, wherein the controller is further configured to:
generate a respective time-stamped event for the redacting or the receiving the input; and
include the respective time-stamped event in the textual list of time-stamped events as rendered at the display screen.

15. The device of claim 11, wherein the controller is further configured to:
provide, with the field, access to respective sensor data used to generate the given time-stamped event.

16. The device of claim 11, wherein the controller is further configured to:
provide, with the field, an identifier of respective sensor data used to generate the given time-stamped event.

17. The device of claim 11, wherein the controller is further configured to:
categorize the given time-stamped event; and
perform the redacting and the replacing based on the given time-stamped event being in a given category.

18. The device of claim 11, wherein the controller is further configured to:
categorize the given time-stamped event, wherein the threshold confidence score is selected based on a category of the given time-stamped event.

19. The device of claim 11, wherein the controller is further configured to:
select the one or more machine learning algorithms based on a type of the incident.

20. The device of claim 11, wherein the field comprises a blank field, a multiple-choice selection field, or a slider field.

* * * * *